(12) United States Patent
Okamoto et al.

(10) Patent No.: US 7,768,666 B2
(45) Date of Patent: Aug. 3, 2010

(54) DEVICE, DEVICE PROCESSING HISTORY STORAGE SYSTEM AND DEVICE PROCESSING HISTORY STORING METHOD

(75) Inventors: Akira Okamoto, Saitama (JP); Jun Wakamatsu, Saitama (JP); Noriyuki Tatsuma, Saitama (JP); Masaki Kurokawa, Saitama (JP); Eiji Nishi, Saitama (JP); Atsuhiro Itoh, Saitama (JP); Fumio Harada, Saitama (JP); Yuriko Inakawa, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1153 days.

(21) Appl. No.: 11/399,514

(22) Filed: Apr. 7, 2006

(65) Prior Publication Data

US 2007/0070401 A1    Mar. 29, 2007

(30) Foreign Application Priority Data

Sep. 21, 2005  (JP)  ............................. 2005-273864
Sep. 26, 2005  (JP)  ............................. 2005-278041

(51) Int. Cl.
*G06F 3/12*    (2006.01)
*G06K 15/00*    (2006.01)
(52) U.S. Cl. ..................... 358/1.15; 358/1.16
(58) Field of Classification Search ............... 358/1.15, 358/1.16, 1.17, 1.18, 1.13, 1.1, 1.6, 1.14, 358/407, 404, 444, 448, 468; 399/1, 8, 9, 399/10; 347/2, 3, 5, 14, 23; 710/15, 62, 710/64
See application file for complete search history.

(56) References Cited

U.S. PATENT DOCUMENTS

2003/0234957 A1* 12/2003 Ohara ....................... 358/1.15
2004/0130744 A1*  7/2004 Wu et al. ................... 358/1.15
2005/0052684 A1*  3/2005 Ferlitsch .................... 358/1.15

FOREIGN PATENT DOCUMENTS

JP        2003-280867        10/2003

* cited by examiner

*Primary Examiner*—Dov Popovici
(74) *Attorney, Agent, or Firm*—Sughrue Mion, PLLC

(57) ABSTRACT

A device processing history storage system in which a device and a terminal are connected through a network, in which the terminal includes: a request portion which transmits to the device a request for device processing or a request for storage of a history of the device processing; a history request portion which requests the device for the history; and a history display portion which displays the history received from the device, and the device includes: a device processing portion which performs the device processing; a history generation portion which generates a history of the device processing performed by the device processing portion; a history storage portion which stores the history generated by the history generation portion; and a history transmission portion which transmits to the terminal the history which is stored in the history storage portion.

30 Claims, 24 Drawing Sheets

PRINT HISTORY

| STORAGE SPACE (URL) | PRINT HISTORY (JOB NAME, USER NAME, TIME, NUMBER OF SHEETS, ...) |
|---|---|
| /PC0800372a0123.html | BUDGET, SATO, 2005/04/01 23:20, 2, ... |
| | SETTLEMENT OF ACCOUNTS, SATO, 2005/04/03 01:40, 5, ... |
| | COMPETITION, SATO, 2005/04/04 19:40, 2, ... |
| | ... |
| /IP192-168-1-123.html | ... |
| /baafle81-1dd2-11b2.html | ... |
| ... | ... |

FIG.3

PRINT HISTORY

| STORAGE SPACE (URL) | PRINT HISTORY (JOB NAME, USER NAME, TIME, NUMBER OF SHEETS, ⋯) |
|---|---|
| /PC0001.html | ⋯ |
| | ⋯ |
| /PC0002.html | TEST, TANAKA, 2005/04/01 23:20, 1, ⋯ |
| | ⋯ |
| ⋯ | ⋯ |

FIG.6

PRINT HISTORY

| STORAGE SPACE (URL) | TERMINAL INFORMATION | PRINT HISTORY (JOB NAME, USER NAME, TIME, NUMBER OF SHEETS, ...) |
|---|---|---|
| /tanaka.html | IP=10.10.10.1 | PC1 TEST, TANAKA, 2005/04/01 15:20, 1, ... |
| | | ... |
| /tanaka.html | IP=10.10.10.2 | MATERIAL PC2, TANAKA, 2005/04/01 16:07, 3, ... |
| | | ... |
| ... | ... | ... |

FIG.11

CORRESPONDING INFORMATION

| No | PRINT SOURCE INFORMATION (IP ADDRESS) | URL FOR HISTORY (AUTHENTICATION USER/PASSWORD) |
|---|---|---|
| 1 | IP=192.168.1.120 | http://192.168.1.100/rirekisample.html (USER=NONE, PASS=NONE) |
| 2 | IP=192.168.1.200 | http://192.168.1.100/rireki12345678.html (USER=abc, PASS=xyz) |
| 3 | IP=192.168.1.50 | http://192.168.1.100/rirekiABCDEFG.html (USER=123, PASS=789) |
| ... | ... | ... |

FIG.19

PRINT HISTORY

| No | URL FOR HISTORY | PRINT HISTORY | |
|---|---|---|---|
| 1 | http://192.168.1.100/rirekisample.html | ... | |
| 2 | http://192.168.1.100/rireki12345678.html | 1 | sample.xdw, 5 pages, color, print success, ... |
| | | 2 | earth.txt, 2 pages, monochrome, print failure, ... |
| | | 3 | meeting material.doc, 10 pages, color, print success, ... |
| | | ... | ... |
| 3 | http://192.168.1.100/rirekiABCDEFG.html | ... | |
| ... | ... | ... | |

FIG.20

| YOUR PRINT HISTORY MANAGEMENT PAGE IS: | ? X |
|---|---|
| URL FOR HISTORY: http://192.168.1.100/rireki12345678.html | |
| AUTHENTICATION USER: abc | |
| PASSWORD: xyz | |

CORRESPONDING INFORMATION

| No | PRINT SOURCE INFORMATION (PRINT USER NAME) | URL FOR HISTORY (AUTHENTICATION USER/ AUTHENTICATION PASSWORD) |
|---|---|---|
| 1 | USER NAME=user0001 | http://192.168.1.150/rirekisample.html (USER=NONE, PASS=NONE) |
| 2 | USER NAME=testuser | http://192.168.1.150/rireki12345678.html (USER=abc, PASS=xyz) |
| 3 | USER NAME=orange | http://192.168.1.150/rirekiABCDEFG.html (USER=123, PASS=789) |
| ... | ... | ... |

FIG.24

DEVICE, DEVICE PROCESSING HISTORY STORAGE SYSTEM AND DEVICE PROCESSING HISTORY STORING METHOD

BACKGROUND OF THE INVENTION

1. Field of the Invention

The present invention relates to a device, a device processing history storage system and a device processing history storing method, and more particularly to a device for storing a history of processing by the device into a desired location, a device processing history storage system and a device processing history storing method.

2. Description of the Related Art

Conventionally, a device such as a printing device has a function to display a history of jobs (hereinafter referred to as a job history) performed by the device.

For example, there are a print system, a printing device and a program, having a Web server disposed in the printing device to make it possible to easily obtain a progress of print processing in the printing device by the Web server and also to make it possible to immediately recognize the contents in addition to the progress in view of the number of pages (e.g., Japanese Patent Laid-Open Publication No. 2003-280867).

A user using the device desires to check a history of his or her jobs by the pertinent device. And, the device user can check the own job history by making user registration and user authentication, but it is troublesome to make the user registration. Besides, there are problems that it is necessary to ensure a storage region for the user registration and a cost is increased.

Besides, the technology described in the above Publication No. 2003-280867 has problems that private information and confidential information are displayed, so that the information on the device user can be accessed, and it is poor in resistance to unauthorized access in view of security.

SUMMARY OF THE INVENTION

An aspect of the present invention provides a device processing history storage system in which a device and a terminal are connected through a network, wherein: the terminal includes: a request portion which transmits to the device a request for device processing or a request for storage of a history of the device processing; a history request portion which requests the device for the history; and a history display portion which displays the history received from the device, and the device includes: a device processing portion which performs the device processing according to the request for the device processing received from the terminal; a history generation portion which generates a history of the device processing performed by the device processing portion; a history storage portion which stores the history generated by the history generation portion in accordance with the request for the storage of the history of the device processing received from the terminal; and a history transmission portion which transmits to the terminal the history which is stored in the history storage portion in accordance with the request for the history received from the terminal.

Another aspect of the present invention provides a device which performs device processing upon accepting a request from a terminal connected through a network, including: a device processing portion which performs the device processing according to the request for device processing received from the terminal; a history generation portion which generates a history of the device processing performed by the device processing portion; a history storage portion which stores the history generated by the history generation portion according to a request for the storage of the history of the device processing received from the terminal; and a history transmission portion which transmits to the terminal the history stored by the history storage portion in accordance with the history request received from the terminal.

Still another aspect of the present invention provides a device processing history storing method which is performed by a device and a terminal connected through a network, in which: the terminal transmits to the device a request for a device processing or a request for storage of a history of the device processing; the device performs the device processing according to the request for the device processing received from the terminal, generates a history of the performed device processing, and stores the generated history according to the request for storage of the history of the device processing received from the terminal; the terminal requests the device for the history; the device transmits the history stored in the history storage portion to the terminal according to the history request received from the terminal; and the terminal displays the history received from the device.

BRIEF DESCRIPTION OF THE DRAWINGS

Embodiments of the present invention will be described in detail based on the following figures, wherein:

FIG. 3 is a diagram showing an example of print histories which are stored by print history storage portions;

FIG. 6 is a diagram showing an example of a print history which is stored by a print history storage portion;

FIG. 11 is a diagram showing an example of a print history stored by a print history storage portion;

FIG. 19 is a diagram showing an example of corresponding information stored in a corresponding information storage portion;

FIG. 20 is a diagram showing an example of a URL for a history and a print history stored in a print history storage portion;

FIG. 24 is a diagram showing an example of corresponding information stored in a corresponding information storage portion.

DETAILED DESCRIPTION OF THE INVENTION

Embodiments of a device processing history storage system and a device processing history storing method according to the present invention will be described in detail with reference to the accompanying drawings. The device according to the invention is intended to be a device such as a printer, a scanner, a router or the like that is provided with a function to store and manage a history. It should be noted that the printer is described as an example in the embodiments.

Example 1

Figure 1:
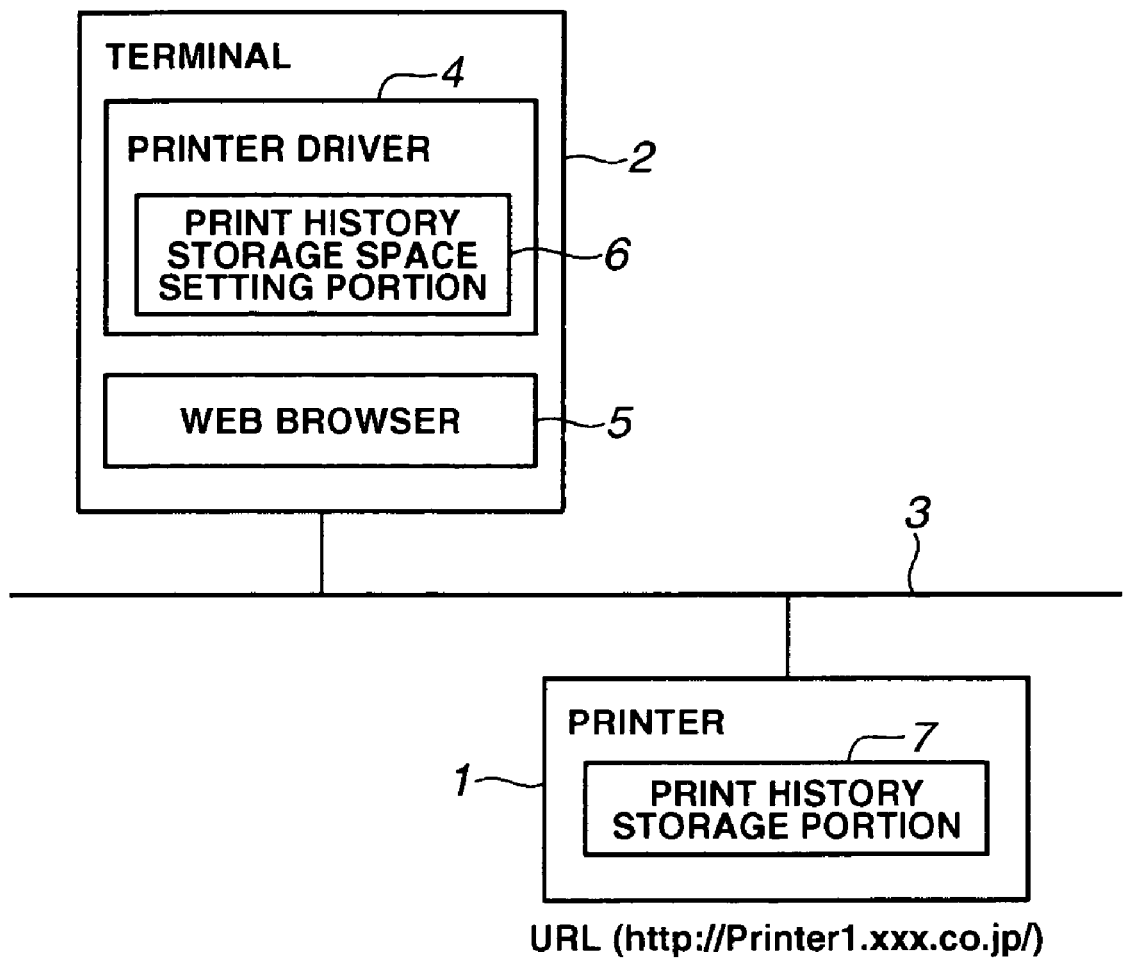
FIG. 1 is a system configuration chart showing Example 1 of a device processing history storage system according to the invention.

FIG. 1 is a system configuration chart showing Example 1 of a device processing history storage system according to the invention.

As shown in FIG. 1, a printer 1 which is a device according to the invention and a terminal 2 such as a desktop PC [personal computer], a notebook PC or the like are connected through a network 3.

A printer driver 4 which is a device driver corresponding to the printer 1 and a Web browser 5 are installed in the terminal 2.

In a case where a file generated by an application of the terminal 2 is to be printed by the printer 1, the printer driver 4 performs processing to generate print data according to the file and to make a print request to the printer 1.

The printer driver 4 is provided with a print history storage space setting portion 6. The print history storage space setting portion 6 sets a storage space (e.g., a URL [Uniform Resource Locator] or the like) for a print history that a print request is made from the terminal 2 to the printer 1. The terminal 2 instructs the printer 1 by a PJL [Printer Job Language] command (a command language for printing to provide a function for controlling a print job during the print processing by the printer 1) or the like so as to store the print history into the storage space determined by the print history storage space setting portion 6 at the time of making the print request.

The printer 1 performs print processing of the print data upon receiving the print data from the terminal 2 through the network 3. The printer 1 has a URL "http://Printer 1.xxx.co.jp".

The printer 1 is provided with a print history storage portion 7 to store and manage information (e.g., job name, user name, time, the number of printed sheets, and the like) related to the print processing performed by the printer 1 as a print history.

Figure 2:
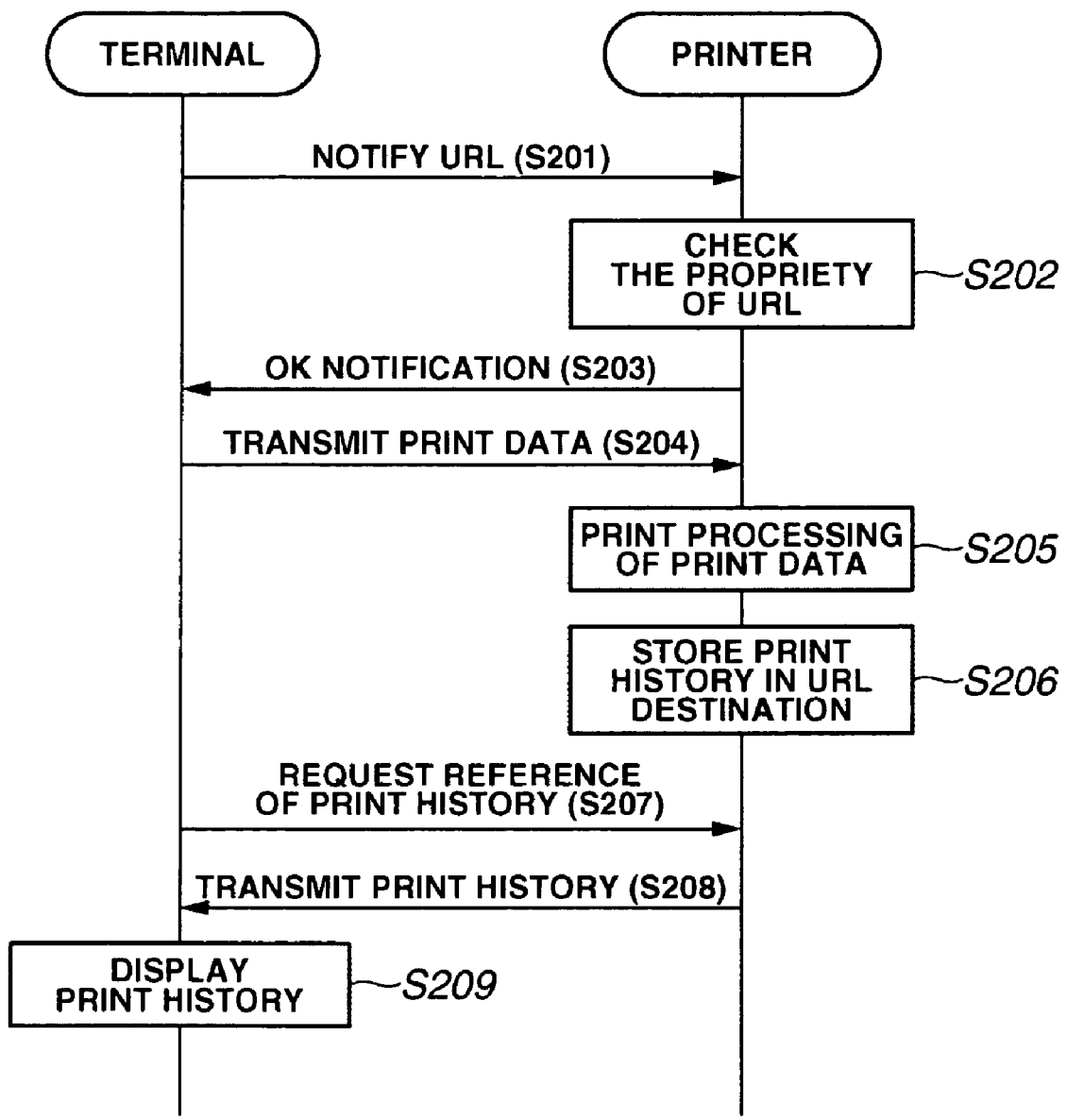
FIG. 2 is a sequence diagram showing a flow of processing to determine a storage space for a print history of a terminal performed by the terminal and a printer.

Then, a flow of processing to determine a storage space for a print history of a terminal performed by the terminal and the printer will be described with reference to the sequence diagram shown in FIG. 2.

Before the processing is started, the user who owns the terminal determines a storage space (e.g., URL=http://Printer 1.xxx.co.jp/PC08000372a0123.html) indicating a storage area in the printer in a print history storage space setting portion of the printer driver.

This processing is started when a print request is first made from the terminal to the printer.

The terminal notifies the printer about the URL set in the print history storage space setting portion of the printer driver (step S201).

Upon receiving the URL from the terminal, the printer checks the propriety of the URL (e.g., to check that a character or a space unusable for the URL is designated) (step S202), and if the URL is appropriate, transmits to the terminal an OK notification which permits the URL as the storage space for the print history (step S203).

When the terminal receives the OK notification from the printer, the printer driver transmits print data to the printer (step S204).

Upon receiving the print data from the terminal, the printer performs print processing of the print data (step S205) and stores the print history of the print processing into the URL address (step S206).

And, to refer to the print history, the terminal accesses the printer by designating the URL by a Web browser to request the printer to refer to the print history (step S207).

Upon receiving the print history reference request from the terminal, the printer transmits to the terminal the print history which is stored in the URL (step S208).

The terminal which has received the print history from the printer displays the print history by the Web browser or the like (step S209).

FIG. 3 is a diagram showing an example of print histories which are stored by print history storage portions.

As shown in FIG. 3, the print histories of printing requested by the individual terminals are stored in the storage spaces designated by the individual terminals.

Example 2

Figure 4:
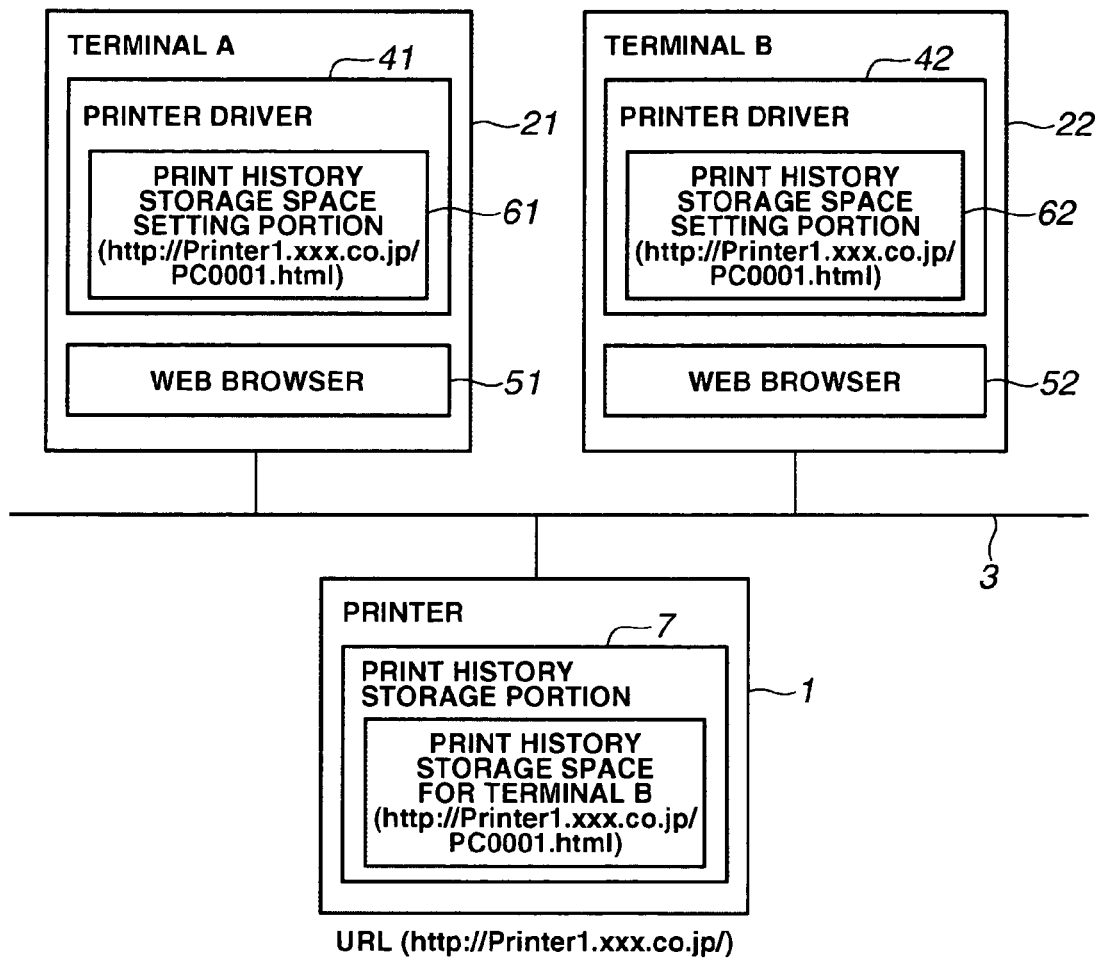
FIG. 4 is a system configuration chart showing Example 2 of a device processing history storage system according to the invention.

FIG. 4 is a system configuration chart showing Example 2 of a device processing history storage system according to the invention. It is assumed in Example 2 that "URL=http://Printer 1.xxx.co.jp/PC00001.html" is determined as a storage space for the print history of a terminal B 22.

As shown in FIG. 4, the printer 1 which is a device according to the invention is connected to a terminal A 21 and the terminal B 22 which are a desktop PC, a notebook PC or the like through the network 3.

Printer drivers (41, 42) which are device drivers corresponding to the printer 1 and Web browsers (51, 52) are installed in the terminal A 21 and the terminal B 22, respectively.

In a case where a file generated by an application of the terminal (21, 22) is printed by the printer 1, the printer driver (41, 42) performs processing to generate print data according to the file and to make a print request to the printer 1.

Besides, the printer driver (41, 42) is provided with a print history storage space setting portion (61, 62). The print history storage space setting portion (61, 62) determines a storage space (e.g., a URL or the like) for the print history of printing requested from the terminal (21, 22) to the printer 1. The terminal (21, 22) instructs the printer 1 by a PJL command or the like to store the print history into the storage space determined by the print history storage space setting portion (61, 62) at the time of making the print request.

Upon receiving print data from the terminal (21, 22) through the network 3, the printer 1 performs print processing of the print data. The printer 1 has a URL "http://Printer 1.xxx.co.jp".

The printer 1 is provided with the print history storage portion 7 to store and manage information (e.g., job name, user name, time, the number of printed sheets, and the like) related to the print processing performed by the printer 1 as a print history.

But, as shown in FIG. 4, "URL=http://Printer 1.xxx.co.jp/PC00001.html" is determined as a storage space for the print history of the terminal B 22 (a print history storage space for the terminal B is determined to "URL=http://Printer 1.xxx.co.jp/PC00001.html" in the print history storage portion 7 of the printer 1).

Where the terminal A 21 instructs the printer 1 to store the print history of the terminal A 21 into the same "URL=http://Printer 1.xxx.co.jp/PC00001.html" as the storage space for the print history of the terminal B 22, the printer 1 proposes a different storage space to the terminal A 21. If the terminal A 21 approves the different storage space proposed by the printer 1, the terminal A 21 instructs the printer 1 to store the print history of the terminal A 21 into the pertinent storage space. If the terminal A 21 desires to store in a storage space different from the storage space proposed by the printer 1, the terminal A 21 determines another storage space in the print history storage portion 61 and instructs the printer 1 to store the print history of the terminal A 21 into the determined storage space.

Figure 5:
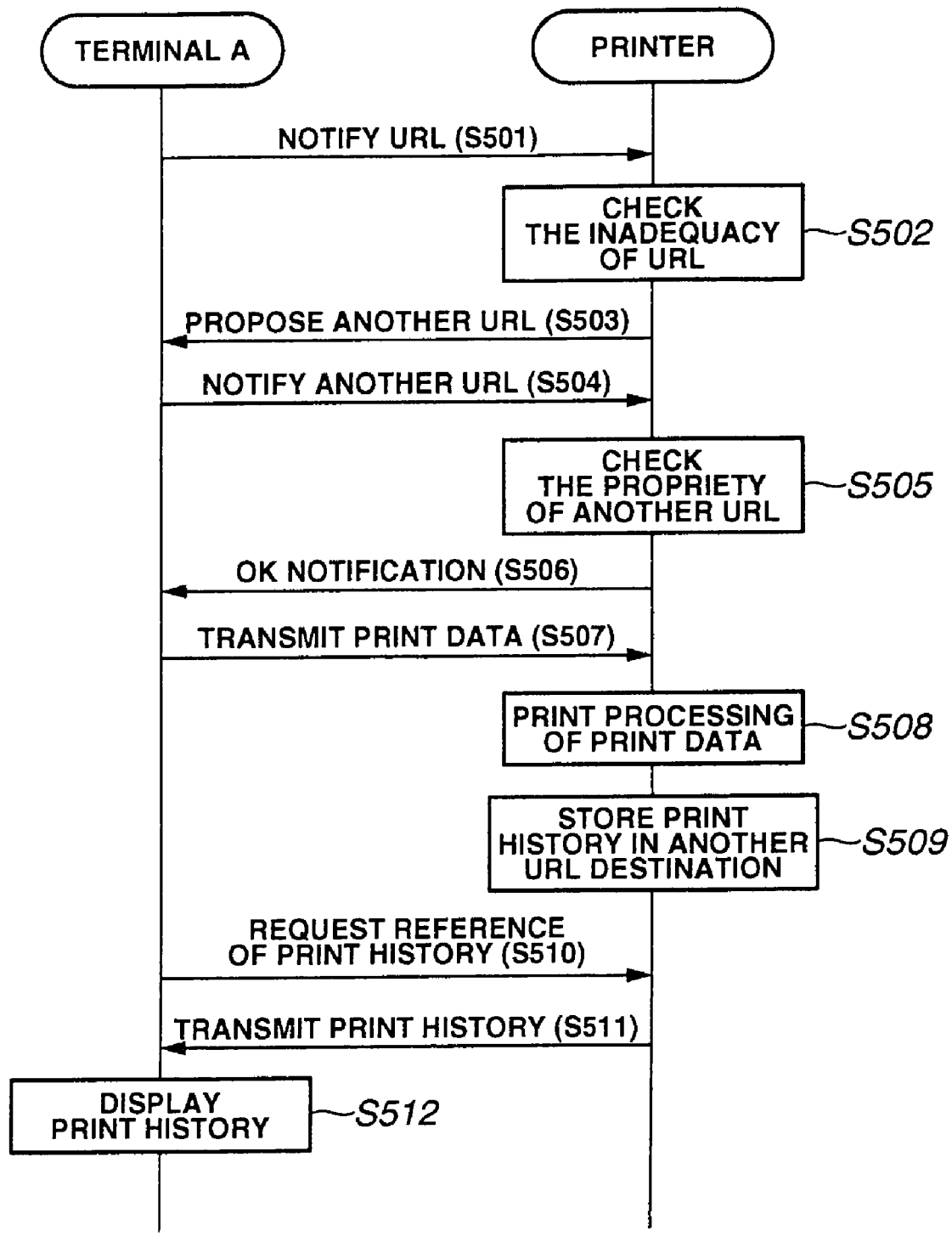
FIG. 5 is a sequence diagram showing a flow of processing to determine a storage space for a print history of a terminal A performed by the terminal A and a printer.

Then, a flow of processing to determine a storage space for a print history of the terminal A performed by the terminal A and the printer will be described with reference to the sequence diagram shown in FIG. 5.

Before the processing is started, the user who owns the terminal A determines in a print history storage space setting portion of the printer driver a storage space (e.g., URL=http://Printer 1.xxx.co.jp/PC00001.html) indicating a storage area in the printer.

The above processing is started when the print request is first made from the terminal A to the printer.

The terminal A notifies the printer about the URL determined for the print history storage space setting portion of the printer driver (step S501).

When the printer receives the notification about the URL from the terminal A and confirms the inadequacy of the URL (namely, the URL duplicates) (step S502), the printer proposes to the terminal a different URL (e.g., "URL=http://Printer 1.xxx.co.jp/PC00002.html") as another storage space for the print history (step S503).

The terminal A receives the different URL from the printer, and if the received different URL is appropriate, the terminal A notifies the printer about the different URL (S504). If the different URL proposed by the printer is not appropriate, another URL is determined in the print history storage space setting portion, and the terminal A notifies the printer about the newly determined URL. But, if the newly determined URL duplicates, another URL is also proposed from the printer.

The printer having received the notification about the different URL form the terminal A checks the notified different URL for the propriety (step S505), and if it is appropriate, transmits to the terminal A an OK notification that approves the different URL as the storage space for the print history (step S506).

When the terminal A receives the OK notification from the printer, the printer driver transmits the print data to the printer (step S507).

Upon receiving the print data from the terminal A, the printer performs print processing of the print data (step S508) and stores the print history of the print processing in the pertinent different URL address (step S509).

And, to refer to the print history, the terminal A accesses the printer by designating the different URL by a Web browser to request the printer to refer to the print history (step S510).

Upon receiving the print history reference request from the terminal A, the printer transmits to the terminal A the print history which is stored in the different URL (step S511).

The terminal A which has received the print history from the printer displays the print history by the Web browser or the like (step S512).

FIG. 6 is a diagram showing an example of a print history which is stored by a print history storage portion.

As shown in FIG. 6, the print history of the terminal B is stored in the storage space "URL=http://Printer 1.xxx.co.jp/PC00001.html", and the print history of the terminal A is stored in the storage space "URL=http://Printer 1.xxx.co.jp/PC00002.html".

Example 3

Figure 7:
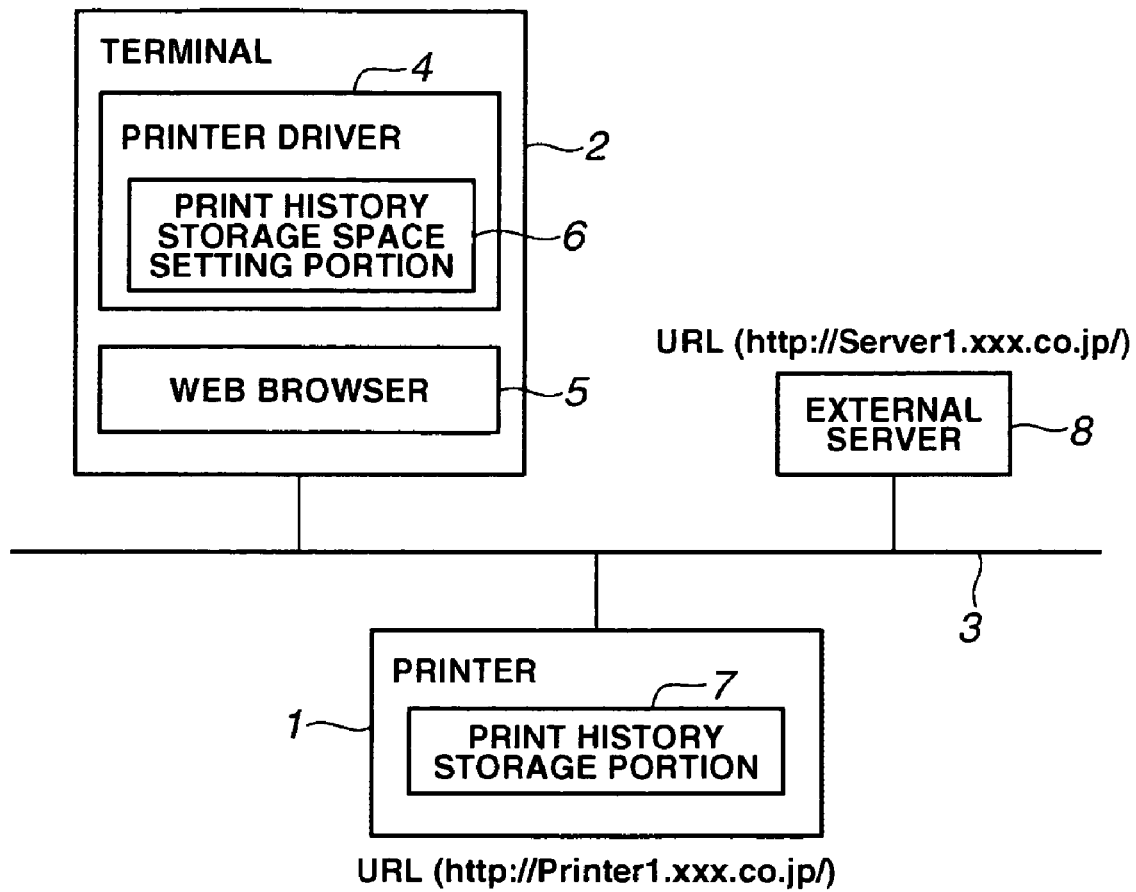
FIG. 7 is a system configuration chart showing Example 3 of a device processing history storage system according to the invention.

FIG. 7 is a system configuration chart showing Example 3 of a device processing history storage system according to the invention.

As shown in FIG. 7, the printer 1 which is a device according to the invention is connected to the terminal 2, which is a desktop PC, a notebook PC or the like, and an external server 8, which is a file server or the like for storing multiple files, through the network 3.

The printer driver 4 which is a device driver corresponding to the printer 1 and the Web browser 5 are installed in the terminal 2.

Where a file generated by an application of the terminal 2 is to be printed by the printer 1, the printer driver 4 performs processing to generate print data according to the file and to request the printer 1 to perform printing.

The printer driver 4 is provided with the print history storage space setting portion 6. The print history storage space setting portion 6 determines a storage space (e.g., a URL or the like) for the print history of printing requested from the terminal 2 to the printer 1. The terminal 2 instructs the printer 1 by a PJL command or the like to store the print history into the storage space which is determined by the print history storage space setting portion 6 at the time of making the print request.

Upon receiving the print data from the terminal 2 through the network 3, the printer 1 performs print processing of the print data. Here, the printer 1 has a URL "http://Printer 1.xxx.co.jp".

The printer 1 is provided with the print history storage portion 7 to store and manage information (e.g., job name, user name, time, the number of printed sheets, and the like) related to the print processing performed by the printer 1 as a print history.

The external server 8 can store the print history of the printer 1. There is an external server that requires a user ID and a password at the time of accessing. Here, the external server has a URL "http://Server 1.xxx.co.jp".

Where the terminal 2 instructs the printer 1 to store the print history into the external server 8, the printer 1 accesses the external server 8, and if it is possible to store and update the print history, stores the print history of the terminal 2 into the external server 8.

Figure 8:
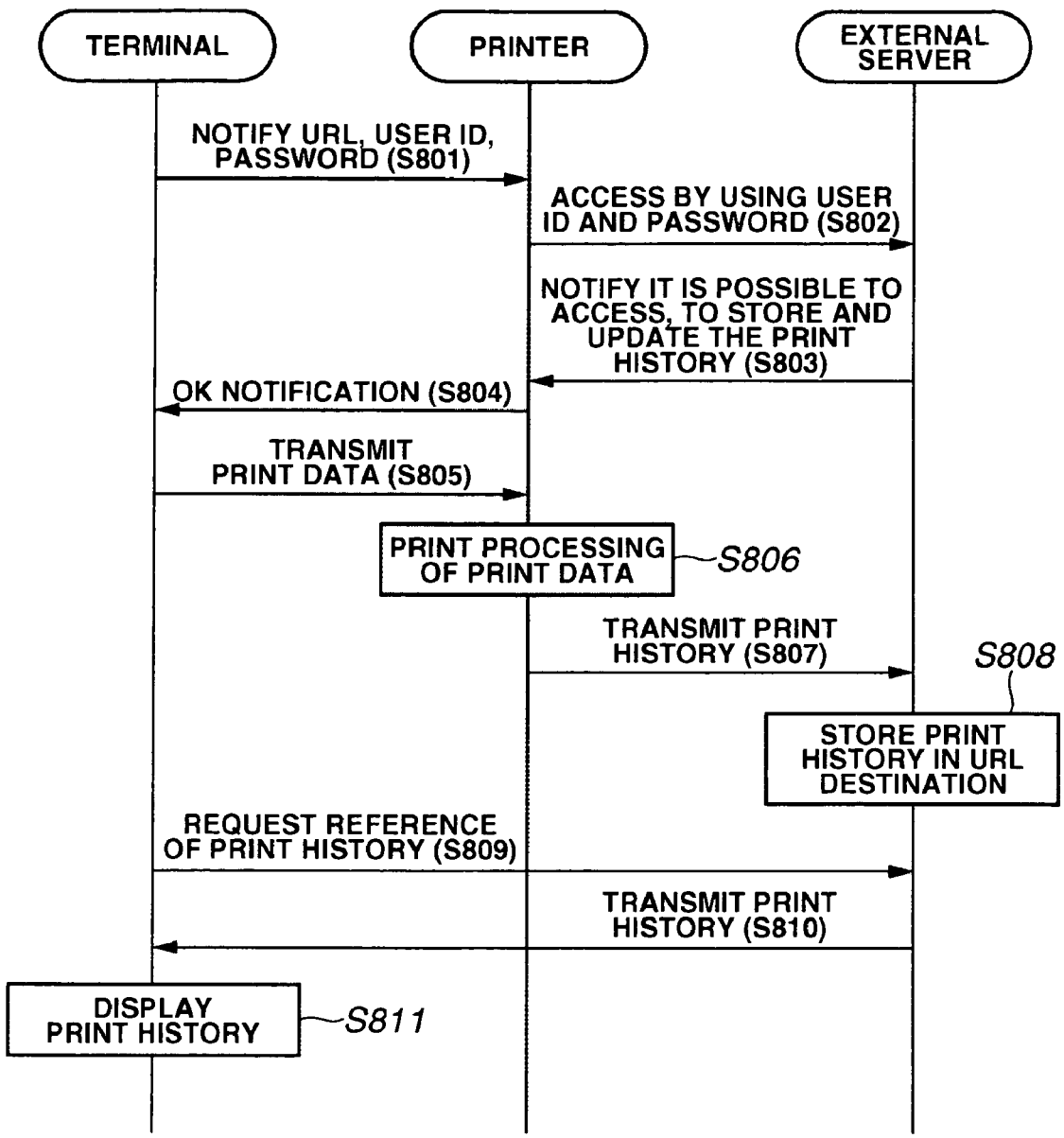
FIG. 8 is a sequence diagram showing a flow of processing to determine a storage space for a print history of a terminal performed by the terminal, a printer and an external server.

Then, a flow of processing to determine a storage space for the print history of the terminal performed by the terminal, the printer and the external server will be described with reference to the sequence diagram shown in FIG. 8.

Before the processing is started, the user who owns the terminal determines in a print history storage space setting portion of the printer driver a storage space (e.g., URL=http://Server 1.xxx.co.jp/PrintJobList/PC0001.html) indicating a storage area in the external server.

The above processing is started when the print request is first made from the terminal to the printer.

The terminal notifies the printer about the URL determined for the print history storage space setting portion of the printer driver and the user ID and the password required for accessing the external server (step S801). If the user ID and the password for accessing the external server are not required, the notification is not required.

Upon receiving the notification about the URL, the user ID and the password from the terminal, the printer uses the user ID and the password to access the external server designated by the URL (step S802).

The external server accepts the access from the printer, and if it is possible to access the external server and to store and update the print history, the external server notifies the printer about it (step S803).

When the printer receives from the external server the notification that the access can be made and the storage and update of the print history can be made, the printer transmits to the terminal an OK notification to approve the URL as the storage space for the print history (step S804).

When the terminal receives the OK notification from the printer, the printer driver transmits print data to the printer (step S805).

Upon receiving the print data from the terminal, the printer performs print processing of the print data (step S806) and transmits the print history of the print processing to the external server (step S807).

The external server having received the print history from the printer stores the print history into the designated URL (step S808).

And, to refer to the print history, the terminal accesses the external server by designating the URL by a Web browser and requests the external server to refer to the print history (step S809).

Upon receiving the print history reference request from the terminal, the external server transmits to the terminal the print history which is stored in the URL (step S810).

The terminal having received the print history from the external server displays the print history by the Web browser or the like (step S811).

Example 4

Figure 9:
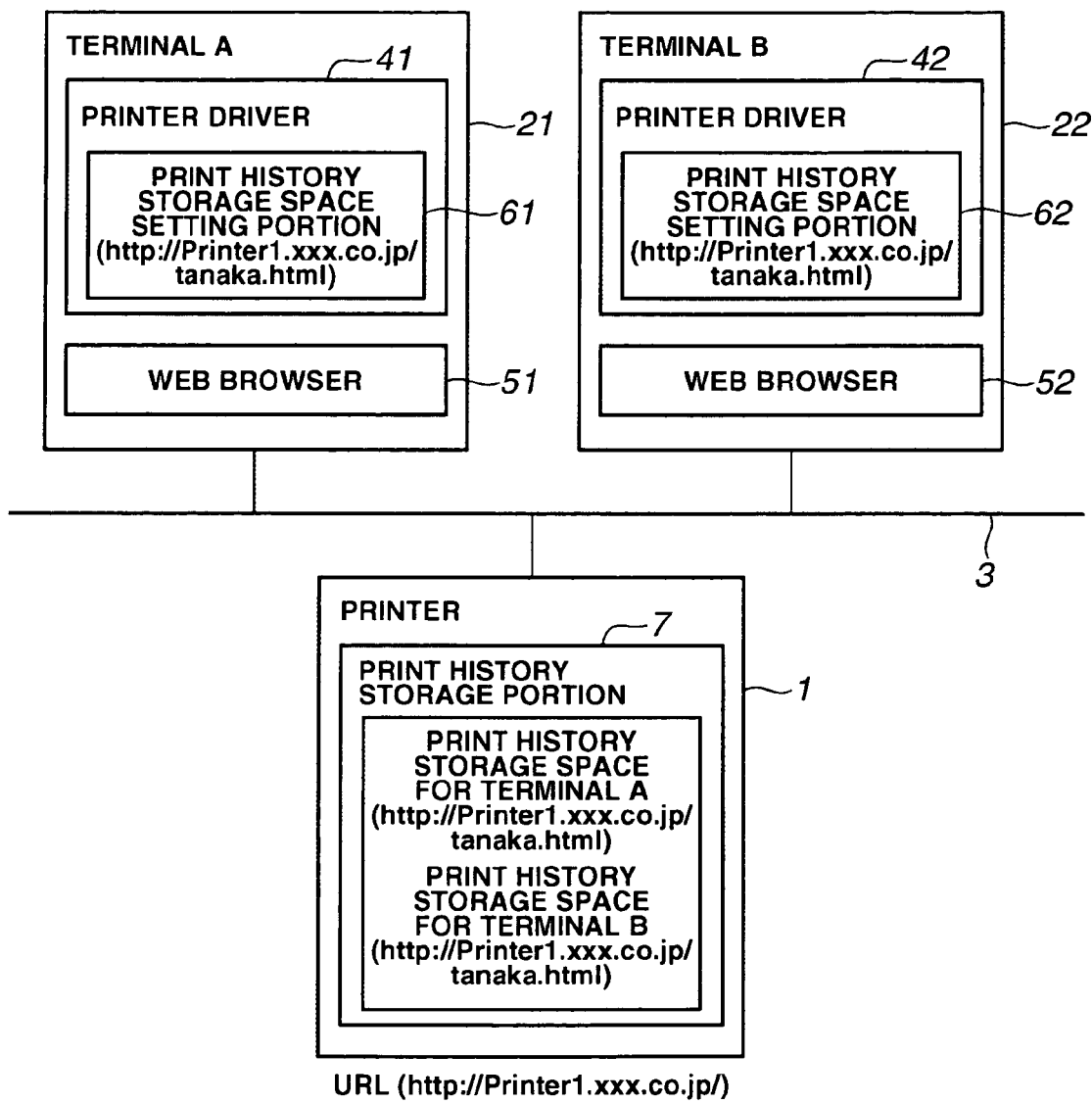
FIG. 9 is a system configuration chart showing Example 4 of a device processing history storage system according to the invention.

FIG. 9 is a system configuration chart showing Example 4 of the device processing history storage system according to the invention.

As shown in FIG. 9, the printer 1 which is a device according to the invention is connected to the terminal A 21 and the terminal B 22, which are a desktop PC, a notebook PC or the like, through the network 3.

The printer drivers (41, 42) which are device drivers corresponding to the printer 1 and the Web browsers (51, 52) are installed in the terminal A 21 and the terminal B 22, respectively.

In a case where a file generated by an application of the terminal (21, 22) is printed by the printer 1, the printer driver (41, 42) performs processing to generate print data according to the file and to make a print request to the printer 1.

Besides, the printer driver (41, 42) is provided with a print history storage space setting portion (61, 62). The print history storage space setting portion (61, 62) determines a storage space (e.g., a URL or the like) for the print history of printing requested from the terminal (21, 22) to the printer 1. The terminal (21, 22) instructs the printer 1 by a PJL command or the like to store the print history into the storage space determined by the print history storage space setting portion (61, 62) at the time of making the print request.

Upon receiving print data from the terminal (21, 22) through the network 3, the printer 1 performs print processing of the print data. The printer 1 has a URL "http://Printer 1.xxx.co.jp".

The printer 1 is provided with the print history storage portion 7 to store and manage information (e.g., job name, user name, time, the number of printed sheets, and the like) related to the print processing performed by the printer 1 as a print history. The print history storage portion 7 has the following four operation modes when the storage spaces duplicate.

1. Duplication disabling mode to propose a different storage space to the terminal (corresponding to Example 2).
2. Overwrite duplication enabling mode to save by overwriting a print history.
3. Additional write duplication enabling mode to additionally write a print history.
4. Terminal discrimination duplication enabling mode to discriminate a terminal according to terminal information (e.g., IP address, terminal name, MAC [Media Access Control] address and the like) and to store in a different area for each terminal.

It is assumed in Example 4 that the terminal discrimination duplication enabling mode has been set.

When the terminal A 21 instructs the printer 1 to store the print history of the terminal A 21 into a storage space "URL=http://Printer 1.xxx.co.jp/tanaka.html", the printer 1 which is set to the terminal discrimination duplication enabling mode obtains terminal information about the terminal A 21 contained in the instruction, and stores the print history and the terminal information about the terminal A 21 together into the storage space.

When the terminal B 22 instructs the printer 1 to store the print history of the terminal B 22 into the same "URL=http://Printer 1.xxx.co.jp/tanaka.html" as the storage space for the print history of the terminal A 21, the printer 1 which is set to the terminal discrimination duplication enabling mode obtains terminal information about the terminal B 22 contained in the instruction, and stores the print history and the terminal information about the terminal B 22 together into the storage space.

And, when the terminal A 21 requests the printer 1 to refer to the print history, the printer 1 transmits to the terminal A 21 the print history (namely, the print history of the terminal A 21) which is stored together with the terminal information about the terminal A 21 from the storage space for the print history of the terminal A 21.

When the terminal B 22 requests the printer 1 to refer to the print history, the printer 1 transmits from the storage space for the print history of the terminal B 22 to the terminal B 22 the print history (namely, the print history of the terminal B) which is stored together with the terminal information about the terminal B 22.

Figure 10:
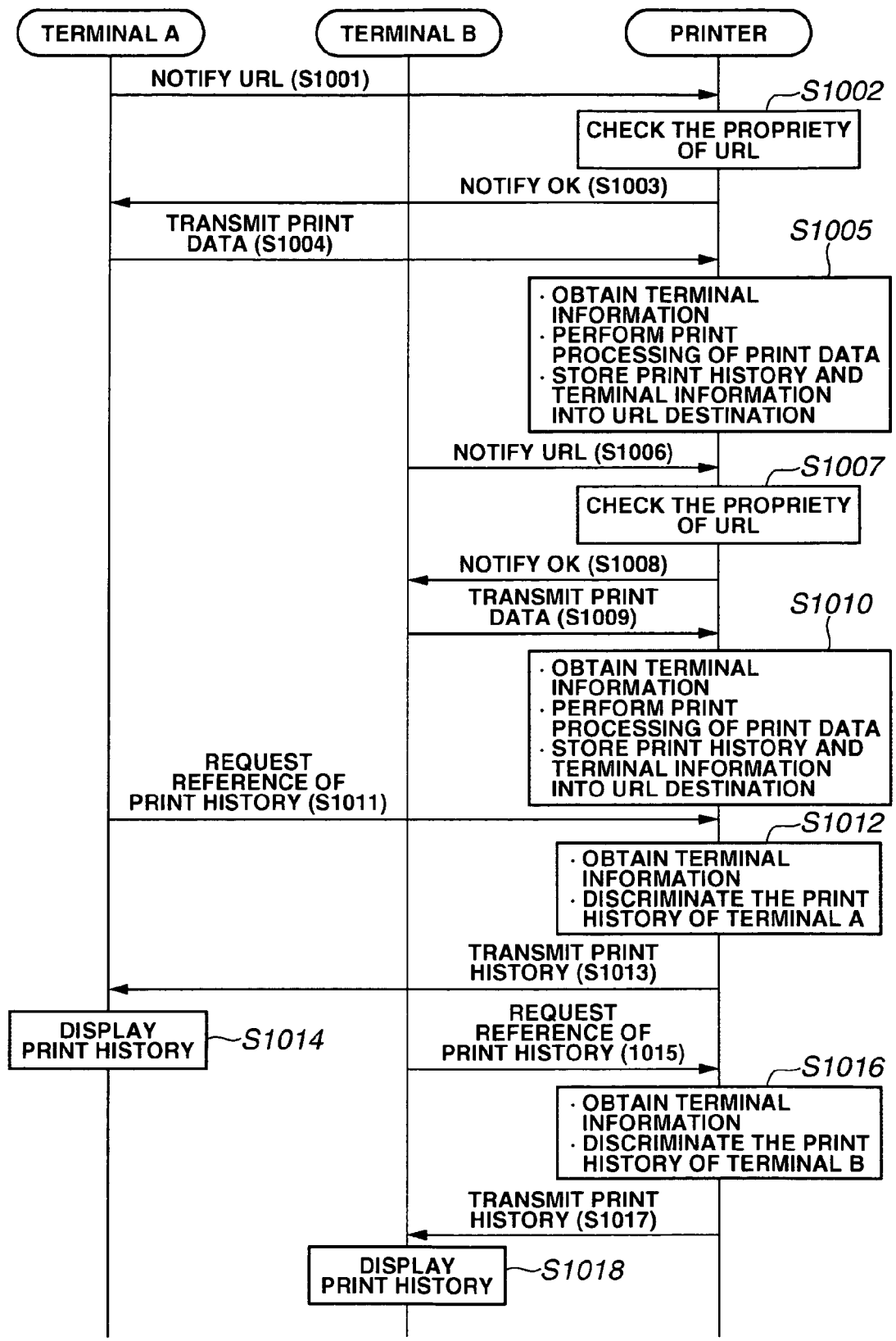
FIG. 10 is a sequence diagram showing a flow of processing to determine a storage space for print histories of a terminal A and a terminal B performed by the terminal A, the terminal B and a printer.

Then, a flow of processing to determine the storage space for the print history of the terminal A and the terminal B performed by the terminal A, the terminal B and the printer will be described with reference to the sequence diagram shown in FIG. 10.

Before the processing is started, the user who owns the terminal A determines in a print history storage space setting portion of the printer driver a storage space (e.g., URL=http://Printer 1.xxx.co.jp/tanaka.html) indicating a storage area in the printer. And, the user who owns the terminal B determines in a print history storage space setting portion of the printer driver a storage space (e.g., URL=http://Printer 1.xxx.co.jp/tanaka.html) indicating a storage area in the printer.

And, to prevent the storage space from duplicating, the terminal may use the IP address or the MAC address of the terminal for part of the URL, or a UUID [Universal Unique Identifier] which is an identifier capable of assuring by the terminal that it is unique temporally and physically may be generated and contained in part of the URL.

In a case where printing is first requested from the terminal A to the printer, the terminal A notifies the printer about a URL which is set in a print history storage space setting portion of the printer driver (step S1001).

Upon receiving the notification about the URL from the terminal A, the printer checks the propriety of the URL (step S1002), and if the URL is appropriate, transmits to the terminal A an OK notification which approves the URL as a storage space for the print history (step S1003).

When the terminal A receives the OK notification from the printer, the printer driver transmits the print data to the printer (step S1004).

Upon receiving the print data from the terminal A, the printer obtains terminal information from the terminal A, performs print processing of the print data, and stores the terminal information and the print history of the print processing into the URL destination (step S1005).

In a case where printing is first requested from the terminal B to the printer, the terminal B notifies the printer about the URL which is set for the print history storage space setting portion of the printer driver (step S1006).

The printer having received the notification about the URL from the terminal B checks the propriety of the URL (step S1007), and if the URL is appropriate, transmits to the terminal B an OK notification which approves the URL as the storage space for the print history (step S1008).

When the terminal B receives the OK notification from the printer, the printer driver transmits the print data to the printer (step S1009).

Upon receiving the print data from the terminal B, the printer obtains terminal information from the terminal B, performs print processing of the print data, and stores the terminal information and the print history of the print processing into the URL destination (step S1010).

And, where the terminal A refers to the print history, the terminal A accesses the printer by designating the URL by a Web browser and requests the printer to refer to the print history (step S1011).

Upon accepting the print history reference request from the terminal A, the printer obtains terminal information about the terminal A contained in the request, discriminates the print history (namely, the print history of the terminal A) stored together with the terminal information about the terminal A according to the terminal information about the terminal A (step S1012), and transmits the print history to the terminal A (step S1013).

The terminal A having received the print history from the printer displays the print history by the Web browser or the like (step S1014).

Where the terminal B refers to the print history, the terminal B accesses the printer by designating the URL by a Web browser and requests the printer to refer to the print history (step S1015).

Upon accepting the print history reference request from the terminal B, the printer obtains terminal information about the terminal B contained in the request, discriminates the print history (namely, the print history of the terminal B) stored together with the terminal information about the terminal B according to the terminal information about the terminal B (step S1016), and transmits the print history to the terminal B (step S1017).

The terminal B having received the print history from the printer displays the print history by the Web browser or the like (step S1018).

FIG. 11 is a diagram showing an example of a print history stored by a print history storage portion.

As shown in FIG. 11, in a storage space "URL=http://Printer 1.xxx.co.jp/tanaka.html", terminal information "IP=10.10.10.1" about the terminal A is stored together with the print history of the terminal A, and terminal information "IP=10.10.10.2" about the terminal B is stored together with the print history of the terminal B.

Then, a flow of processing performed by the device processing history storage system will be described with reference to the flow charts shown in FIG. 12 through FIG. 16.

Figure 12:
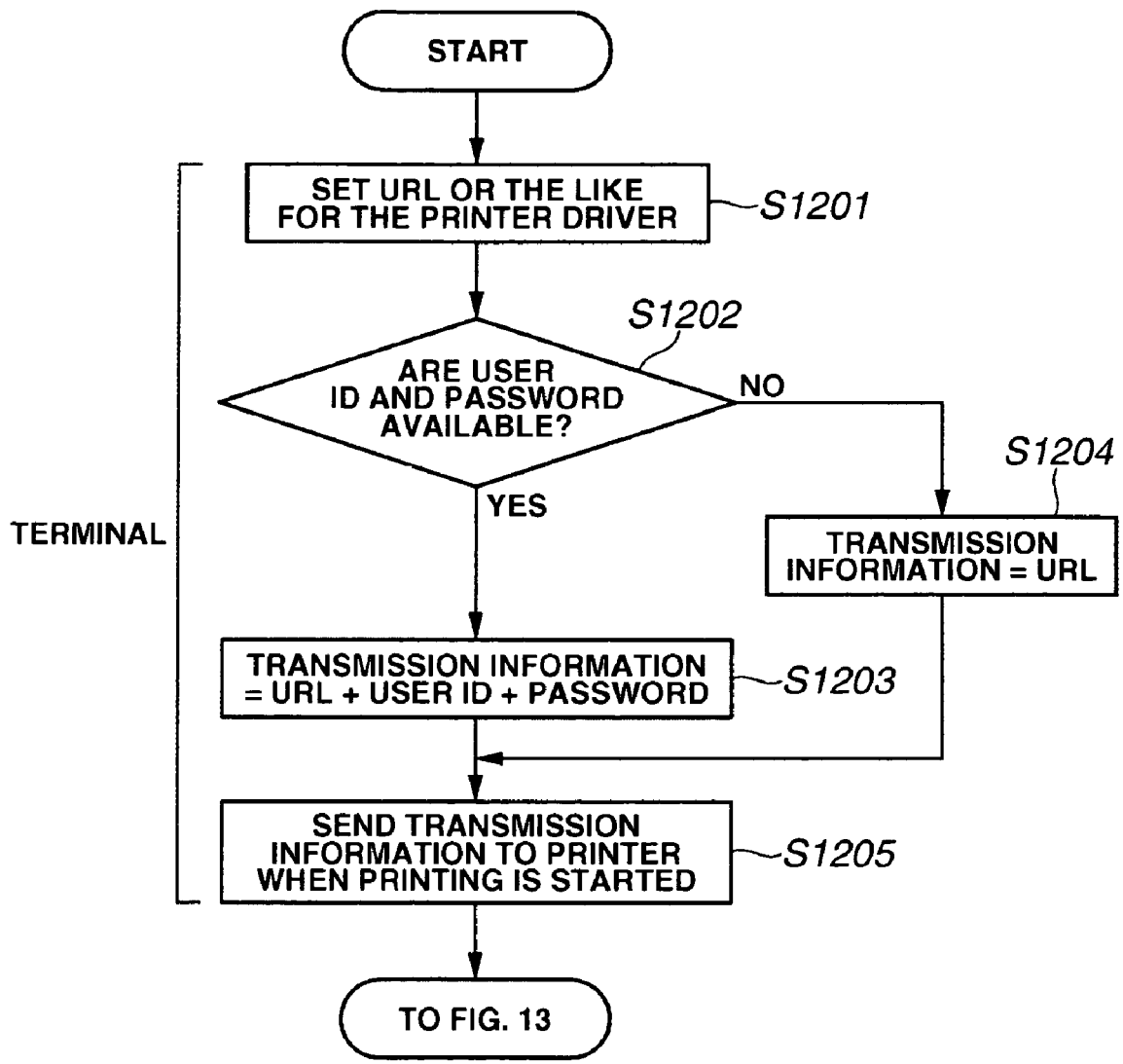
FIG. 12 is a flow chart showing a flow of processing performed by a device processing history storage system.

The flow chart shown in FIG. 12 will be described.

When a URL or the like is set for the printer driver of the terminal (step S1201) and a user ID and a password are also determined (YES in step S1202), transmission information is set to "URL+user ID+password" (step S1203), and the process proceeds to step S1205.

If a user ID and a password are not set (NO in step S1202), the transmission information is set to a "URL" (step S1204), and the process proceeds to step S1205.

Figure 13:
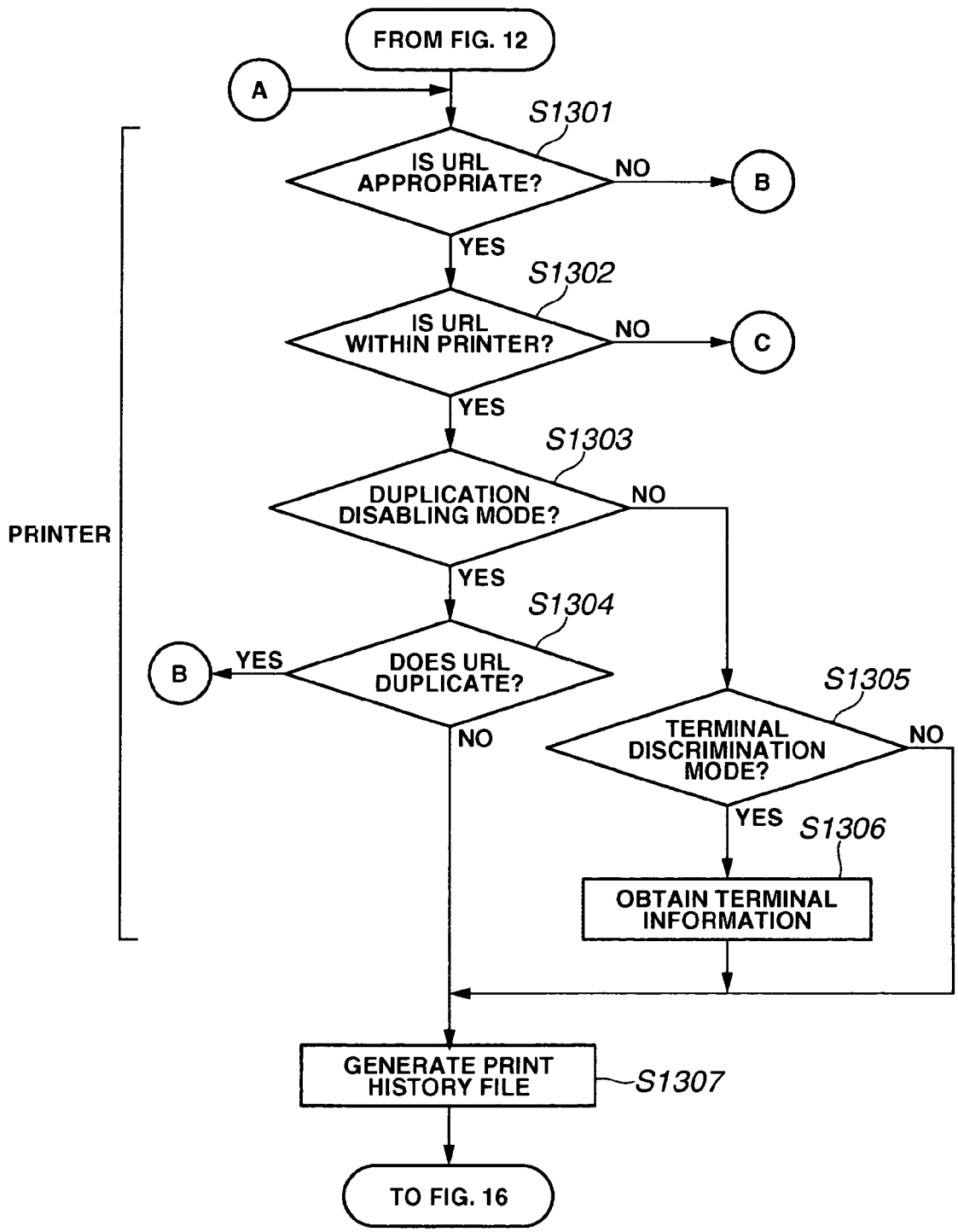
FIG. 13 is a flow chart showing a flow of processing performed by a device processing history storage system.

And, the terminal transmits the transmission information to the printer when the printing is started (step S1205), and the processes proceeds to step S1301 in the flow chart shown in FIG. 13.

Subsequently, the flow chart shown in FIG. 13 will be described.

Figure 14:
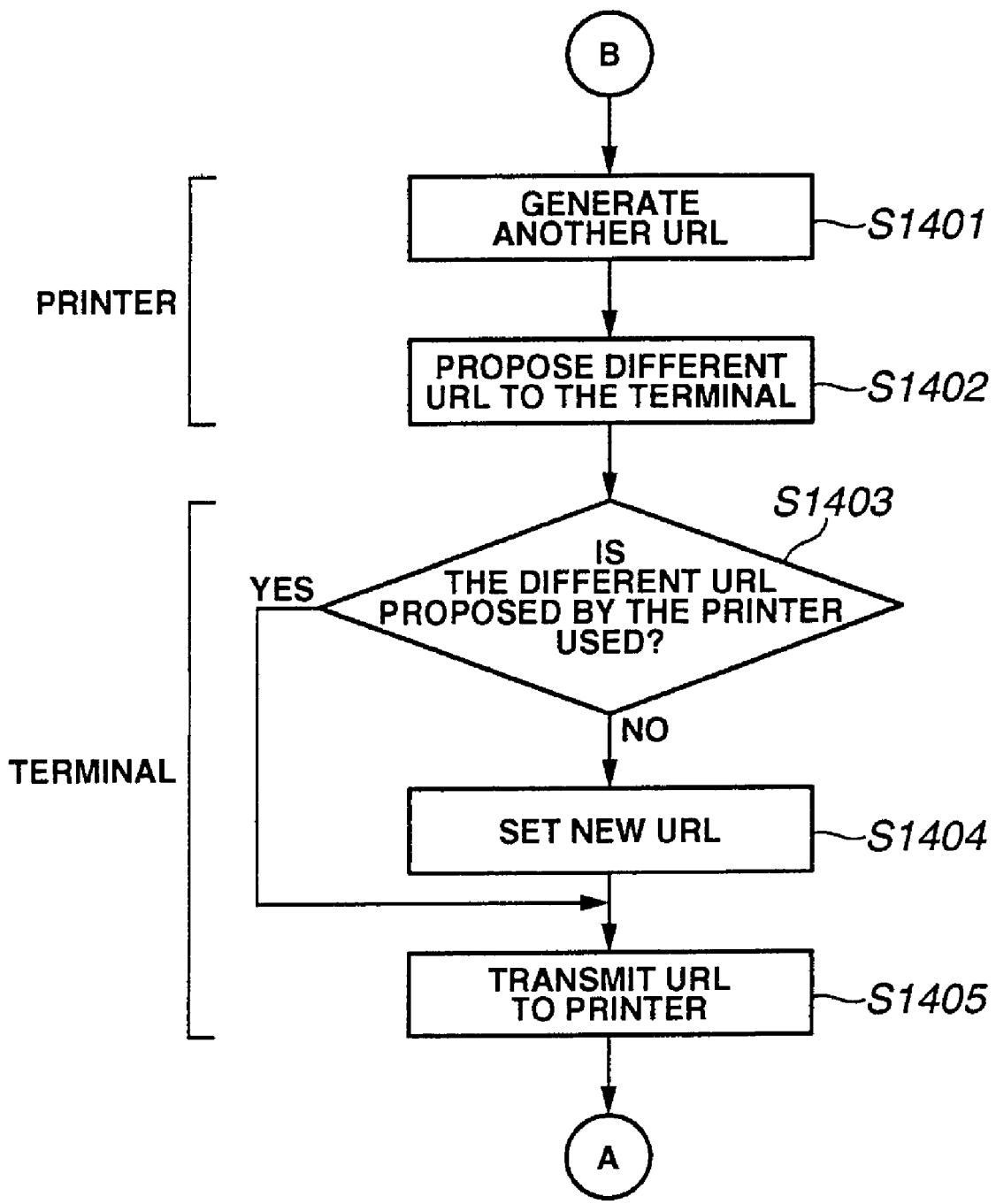
FIG. 14 is a flow chart showing a flow of processing performed by a device processing history storage system.

Upon receiving the transmission information from the terminal, the printer checks the propriety of the URL (step S1301), and if the URL is appropriate (YES in step S1301), the process proceeds to step S1302, but if the URL is inappropriate (NO in step S1301), the process proceeds to step S1401 in the flow chart shown in FIG. 14.

Figure 15:
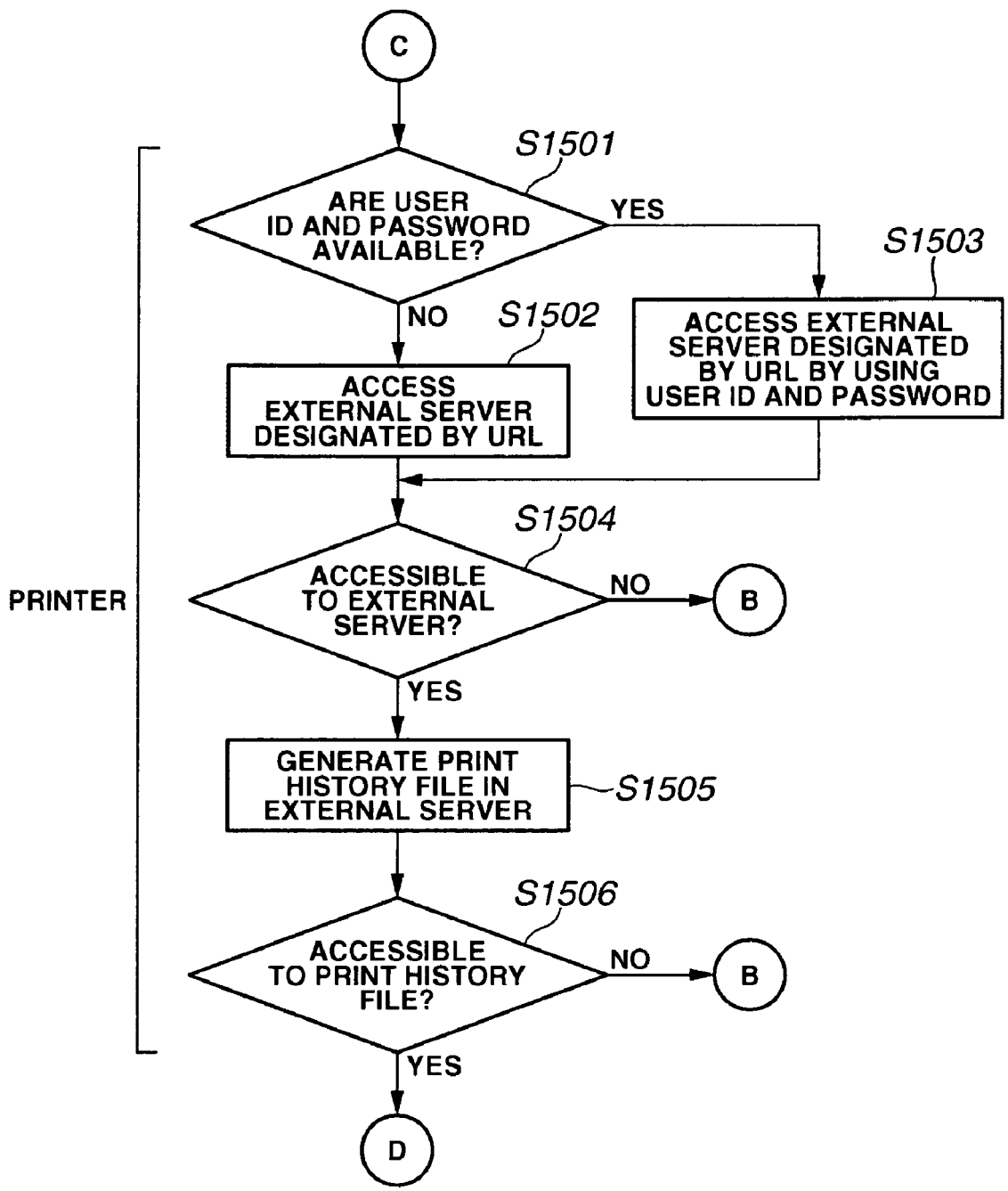
FIG. 15 is a flow chart showing a flow of processing performed by a device processing history storage system.

If the URL is appropriate (YES in step S1301), it is checked whether the URL is a storage area of the printer or an external server (step S1302), and if the URL is a storage area of the printer (YES in step S1302), the process proceeds to step S1303, and if the URL is an external server (NO in step S1302), the process proceeds to step S1501 in the flow chart shown in FIG. 15.

When the URL is a storage area of the printer (YES in step S1302), setting of the mode at the time of URL duplication is checked (step S1303), and when the duplication disabling mode has been set (YES in step S1303), the process proceeds to step S1304. And, when the duplication enabling mode has been set (NO in step S1303), the process proceeds to step S1305.

When the duplication disabling mode has been set (YES in step S1303), it is checked whether or not the URL duplicates (step S1304), and if the URL does not duplicate (NO in step S1304), the process proceeds to step S1307. And, when the URL duplicates (YES in step S1304), the process proceeds to step S1401 in the flow chart shown in FIG. 14.

When the duplication enabling mode has been set (NO in step S1303), it is checked whether or not the terminal discrimination duplication enabling mode has been set (step S1305), and if the terminal discrimination duplication enabling mode has been set (YES in step S1305), the process proceeds to step S1306. And, if the overwrite duplication enabling mode or the additional write duplication enabling mode has been set (NO in step S1305), the process proceeds to step S1307.

If the terminal discrimination duplication enabling mode has been set (YES in step S1305), the terminal information contained in the transmission information from the terminal is obtained (step S1306), and the process proceeds to step S1307.

Figure 16:
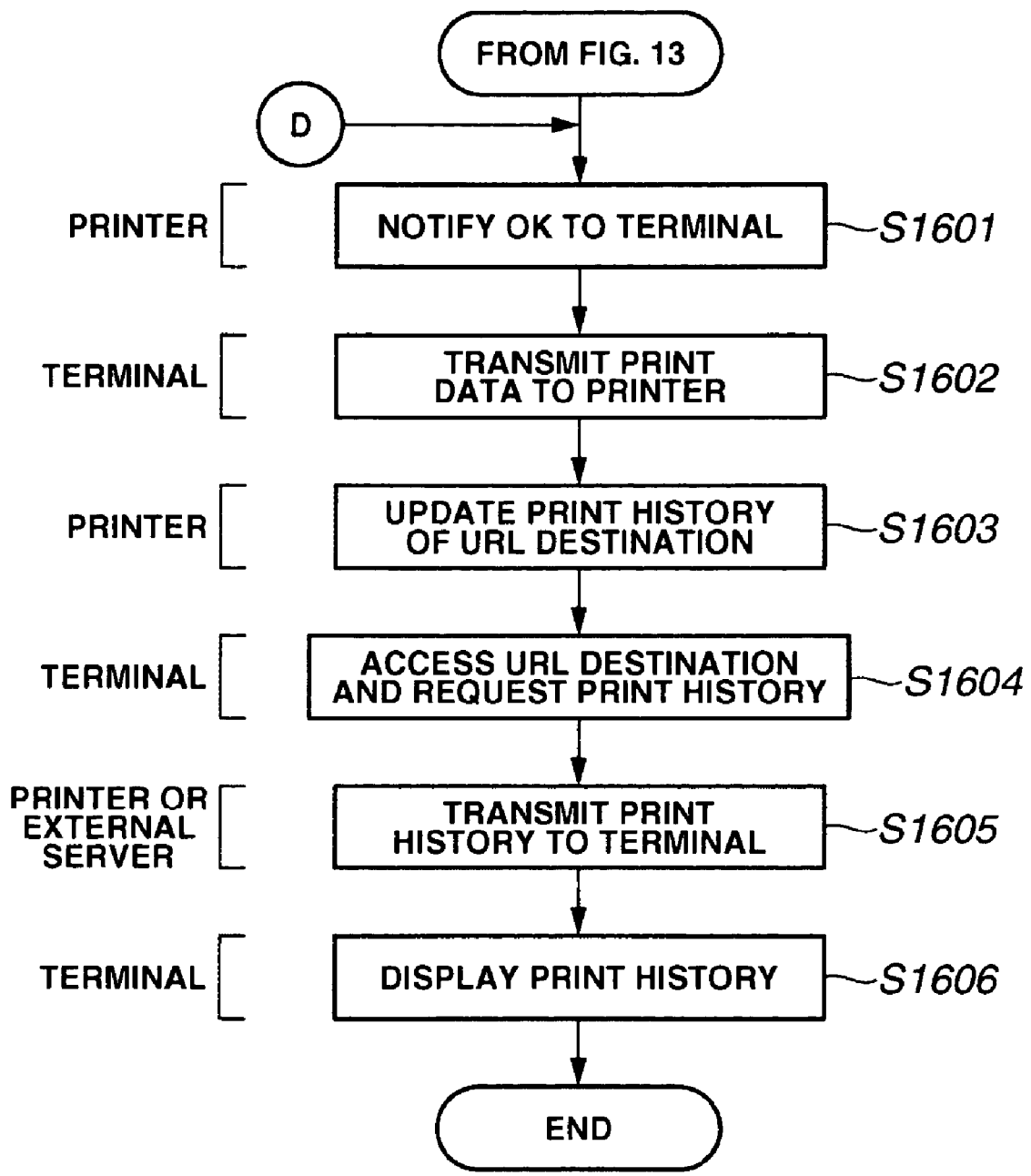
FIG. 16 is a flow chart showing a flow of processing performed by a device processing history storage system.

Then, the printer generates a print history file (step S1307), and the process proceeds to step S1601 in the flow chart shown in FIG. 16.

Subsequently, the flow chart shown in FIG. 14 will be described.

If the URL is inappropriate (NO in step S1301) or if the URL duplicates (YES in step S1304) in the flow chart shown in FIG. 13, and if it is impossible to access the external server (NO in step S1504) or if it is impossible to access the print history file (NO in step S1506) in the flow chart shown in FIG. 15, the printer generates a different URL (step S1401) and proposes the prepared different URL to the terminal (step S1402).

The terminal determines whether or not the different URL proposed by the printer is used (step S1403), and when the different URL proposed by the printer is not used (NO in step S1403), the process proceeds to step S1404, and when the different URL proposed by the printer is used (YES in step S1403), the process proceeds to step S1405.

If the different URL proposed by the printer is not used (NO in step S1403), a new URL is set (step S1404), and the process proceeds to step S1405.

And, the terminal transmits the URL to the printer (step S1405), and the process proceeds to step S1301 in the flow chart shown in FIG. 13.

Subsequently, the flow chart shown in FIG. 15 will be described.

When the URL is an external server (NO in step S1302) in the flow chart shown in FIG. 13, the printer checks whether or not a user ID and a password are contained in the transmitted information (step S1501), and if a user ID and a password are not contained in the transmitted information (NO in step S1501), the process proceeds to step S1502, and if a user ID and a password are contained in the transmitted information (YES in step S1501), the process proceeds to step S1503.

If a user ID and a password are not contained in the transmitted information (NO in step S1501), the printer accesses the external server designated by the URL (step S1502), and the process proceeds to step S1504.

If a user ID and a password are contained in the transmitted information (YES in step S1501), the printer uses the user ID and the password to access the external server designated by the URL (step S1503), and the process proceeds to step S1504.

And, if it is possible to access the external server (YES in step S1504), the process proceeds to step S1505, and if it is impossible to access the external server (NO in step S1504), the process proceeds to step S1401 in the flow chart shown in FIG. 14.

If it is possible to access the external server (YES in step S11504), the printer generates a print history file in the external server (step S1505), and if it is possible to access the print history file (YES in step S1506), the process proceeds to step S1601 in the flow chart shown in FIG. 16, and if it is impossible to access the print history file (NO in step S1506), the process proceeds to step S1401 in the flow chart shown in FIG. 14.

Subsequently, the flow chart shown in FIG. 16 will be described.

The printer notifies the terminal about OK of the URL (step S1601).

The terminal transmits print data to the printer (step S1602).

The printer updates the print history of the URL destination (step S1603).

The terminal accesses the URL destination to request for the print history (step S1604).

The printer or the external server transmits the print history to the terminal (step S1605).

The terminal displays the print history (step S1606).

Example 5

Figure 17:
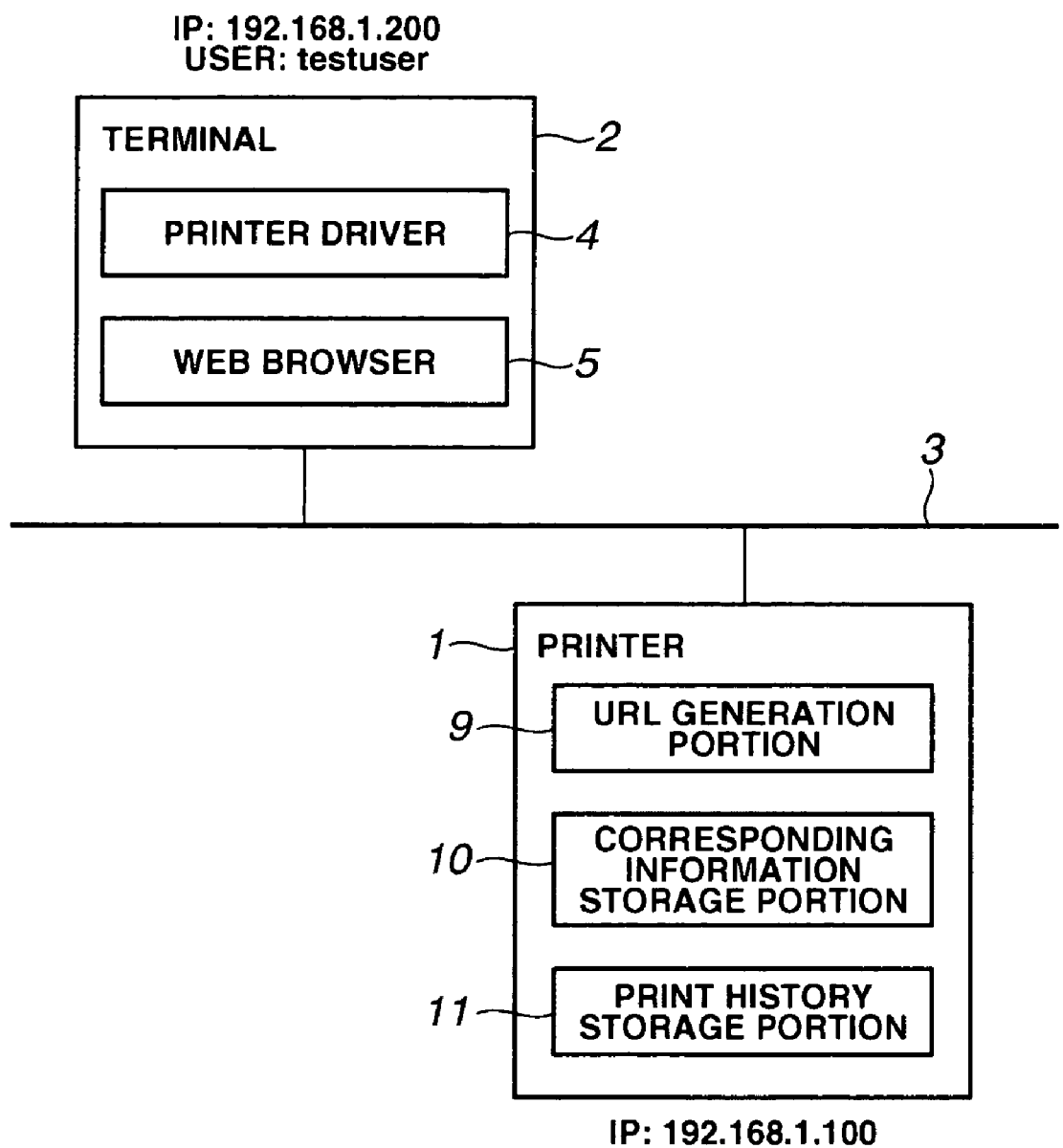
FIG. 17 is a system configuration chart showing Example 5 of a device processing history storage system according to the invention.

FIG. 17 is a system configuration chart showing Example 5 of the device processing history storage system according to the invention.

As shown in FIG. 17, the printer 1 which is a device according to the invention and the terminal 2 such as a desktop PC [personal computer], a notebook PC or the like are connected through the network 3.

The printer driver 4 which is a device driver corresponding to the printer 1 and the Web browser 5 are installed in the terminal 2.

Where a file generated by an application of the terminal 2 is printed by the printer 1, the printer driver 4 performs processing to generate print data according to the file and to make a print request to the printer 1.

And, at the time of requesting printing, the printer driver 4 instructs print source information such as a print user name, a terminal IP address, a MAC [Media Access Control] address and the like to the printer 1 by a PJL [Printer Job Language] command (a print command language which provides a function to control a print job for performing the print processing by the printer 1) or the like.

Upon receiving print data from the terminal 2 through the network 3, the printer 1 performs print processing of the print data.

The printer 1 is provided with a URL generation portion 9 which generates a URL [Uniform Resource Locator] for the print history of the terminal 2 according to the print source information received from the terminal 2, a corresponding information storage portion 10 which stores the print source information received from the terminal 2 and the URL (hereinafter, generally referred to as the corresponding information) generated by the URL generation portion 9 in association with each other, and a print history storage portion 11 which stores the URL generated by the URL generation portion 9 and the print history in association with each other, and stores and manages information (e.g., job name, the number of printed sheets, color printing, printed result, etc.) about the print processing performed by the printer 1 as the print history.

In Example 5, it is determined that the terminal 2 has an IP address "192.168.1.200", the print user name is "testuser", and the printer 1 has an IP address "192.168.1.100". And, communication means between the terminal 2 and the printer 1 performs communications by using a HTTP [Hyper Text Transfer Protocol], an FTP [File Transfer Protocol], a Port 9100 or the like.

Figure 18:
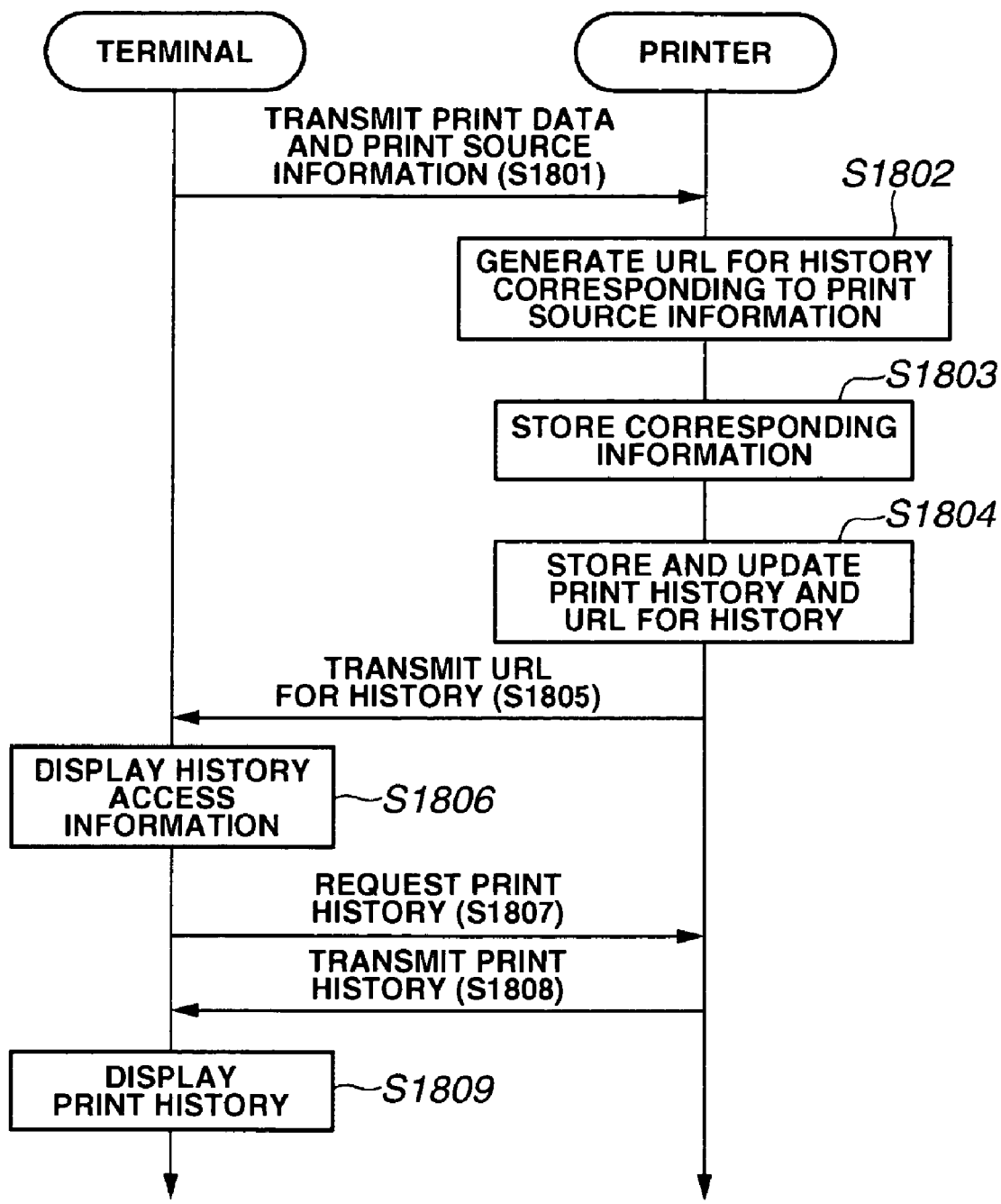
FIG. 18 is a sequence diagram showing a flow of processing to determine a storage space for a print history performed by a terminal and a printer.

Then, a flow of processing to determine a storage space for a print history performed by the terminal and the printer will be described with reference to the sequence diagram shown in FIG. 18.

When the terminal starts to make a print request to the printer, the printer driver of the terminal writes print source information such as the print user name (testuser), the IP address (192.168.1.200) and the like into a PJL command in the print data, and the print data in which the print source information is written is transmitted to the printer (step S1801).

At the time of receiving the print data, the printer obtains the print source information from the PJL command and a protocol, and generates an URL for a history which does not duplicate on the printer corresponding to the obtained print source information (step S1802).

Here, authentication account (e.g., authentication user and password) which is required when accessing the URL at the time of generating the URL according to the setting of the printer is generated. The URL may be generated for each print job or may be generated for a particular terminal and each user.

The URL and the authentication account are generated by using the print source information or the information within the printer. But, it should be noted that is a combination of part of the print source information and a character string is used such that a third party is hard to specify the authentication account.

Example of a combination of an IP address of the print source, a print user name, and a random character string:
URL=http://192.168.1.100/rireki-0001-192168001200-testuser-jN8fQiJk65Mcz.thml.

Example of using a print user name as the authentication user and a random character string as the password:

USER=testuser, PASS=Ohg7 KdW

For a scheme of the URL to be generated, HTTP (http://) or FTP (ftp://) can be used.

And, the printer stores the corresponding information into a corresponding information storage portion (step S1803).

FIG. 19 is a diagram showing an example of corresponding information stored in the corresponding information storage portion.

As shown in FIG. 19, the print source information (IP address in the figure) and the URL for the history are stored in association with each other.

And, the printer stores or updates the URL for the history and the print history in association with each other into the print history storage portion (step S1804).

FIG. 20 is a diagram showing an example of the URL for the history and the print history stored in the print history storage portion.

As shown in FIG. 20, the URL for the history and the print history are stored in association with each other.

The printer contains the URL for the history (also containing the authentication user and the password in a case where an authentication account is generated) into the PJL command and transmits to the terminal (step S1805). As a transmission method, for a protocol having two-way communications, a response of the print command or a back channel is used, and for a protocol not having two-way communications, a protocol (e.g., HTTP or the like) in cooperation with a port monitor is used.

The printer driver of the terminal having received the URL for the history displays history access information which shows the URL for the history (step S1806).

Figures 21A, 21B:
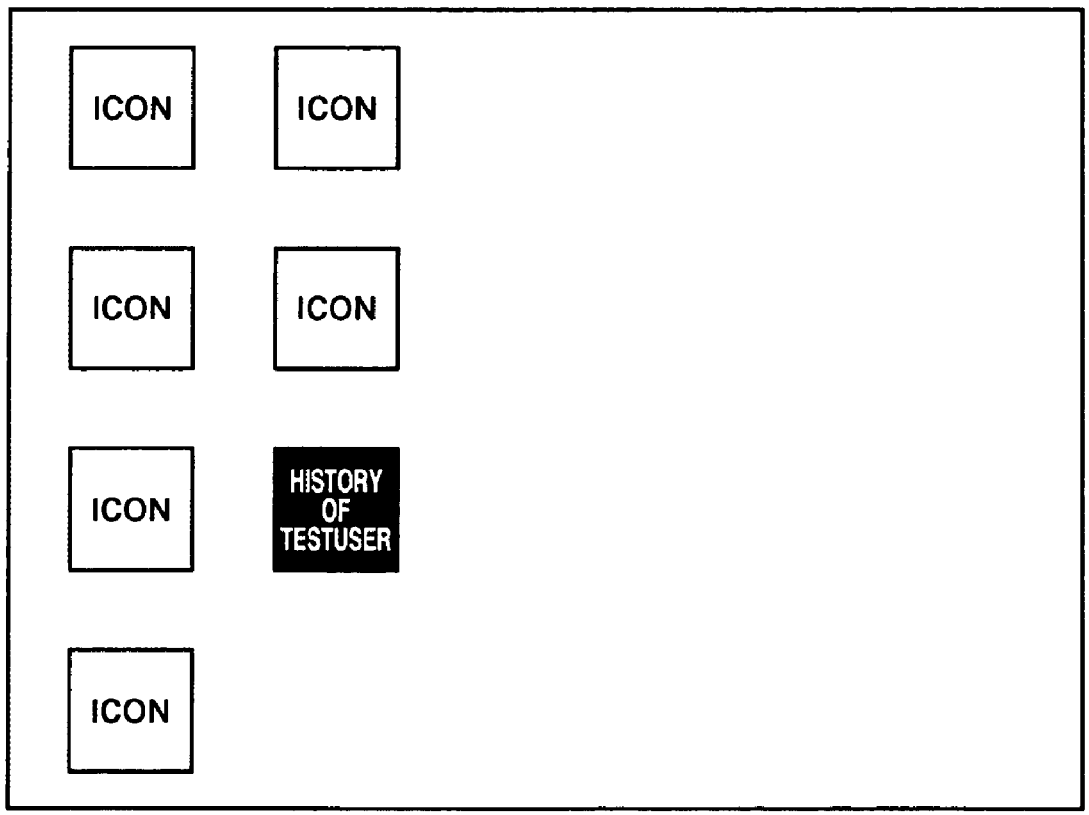
FIGS. 21A and 21B are diagrams showing display examples of history access information.

FIGS. 21A and 21B are diagrams showing display examples of history access information.

FIG. 21A is a diagram showing a display example which shows the history access information as a dialog.

As shown in FIG. 21A, the history access information shows the URL for the history, the authentication user and password as a dialog (the authentication user and password are not displayed if the authentication account is not required for the printer). Here, the URL for the history may be linked to access the URL destination by clicking the URL for the history.

FIG. 21B is a diagram showing a display example of displaying the history access information as shortcut icons on a desktop.

As shown in FIG. 21B, the shortcut icons indicating history access information are displayed on the desktop ("History of testuser" is displayed in the figure), and the URL destination can be accessed by clicking the pertinent shortcut icon.

A method of displaying the history access information can be selected by the user.

And, in a case where the print history is referred to, the terminal designates the URL for the history by the Web browser to access the printer, and requests the printer for the print history (step S1807).

Upon receiving the request for the print history from the terminal, the printer transmits to the terminal the print history which is stored in the URL for the history (step S1808).

The terminal having received the print history from the printer displays the received print history by the Web browser or the like (step S1809).

Example 6

Figure 22:
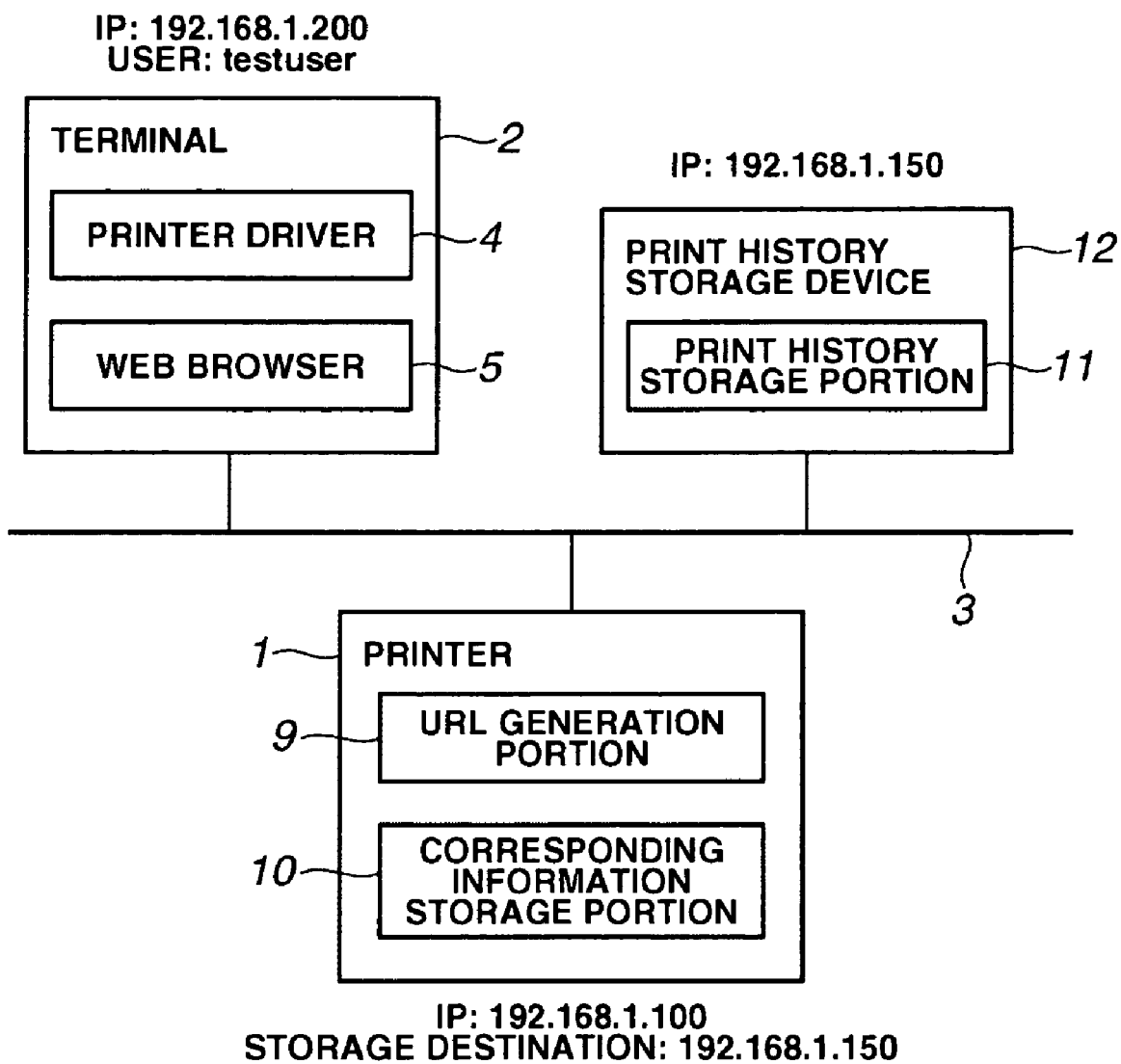
FIG. 22 is a system configuration chart showing Example 6 of a device processing history storage system according to the invention.

FIG. 22 is a system configuration chart showing Example 6 of the device processing history storage system according to the invention.

As shown in FIG. 22, the printer 1 which is a device according to the invention, the terminal 2 such as a desktop PC, a notebook PC or the like and a print history storage device 12 for storing the print history are connected to one another through the network 3.

The printer driver 4 which is a device driver corresponding to the printer 1, and the Web browser 5 are installed in the terminal 2.

Where a file generated by an application of the terminal 2 is printed by the printer 1, the printer driver 4 performs processing to generate print data according to the file and to make a print request to the printer 1.

At the time of making a print request, the printer driver 4 instructs print source information such as a print user name, an IP address of the terminal, a MAC address and the like to the printer 1 by a PJL command or the like.

Upon receiving the print data from the terminal 2 through the network 3, the printer 1 performs processing to print the print data.

The printer 1 is provided with the URL generation portion 9 which generates the URL for the print history of the terminal 2 according to the print source information received from the terminal 2, and the corresponding information storage portion 10 which stores the print source information received from the terminal 2 and the URL generated by the URL generation portion 9 (hereinafter, generally referred to as the corresponding information) in association with each other.

The print history storage device 12 is provided with a print history storage portion 11 which stores the URL generated by the printer 1 and the print history (e.g., job name, the number of printed sheets, color printing, printed result and the like) related to the print processing performed by the printer 1 in association with each other.

In Example 6, it is determined that the terminal 2 has an IP address "192.168.1.200", the print user name is "testuser", the printer 1 has an IP address "192.168.1.100", the print history storage device 12 has an IP address "192.168.1.150", and the IP address of the print history storage device is set as the print history storage destination of the printer 1. To communicate between the terminal 2 and the printer 1, HTTP, FTP, Port 9100 or the like is used as communications means.

Figure 23:
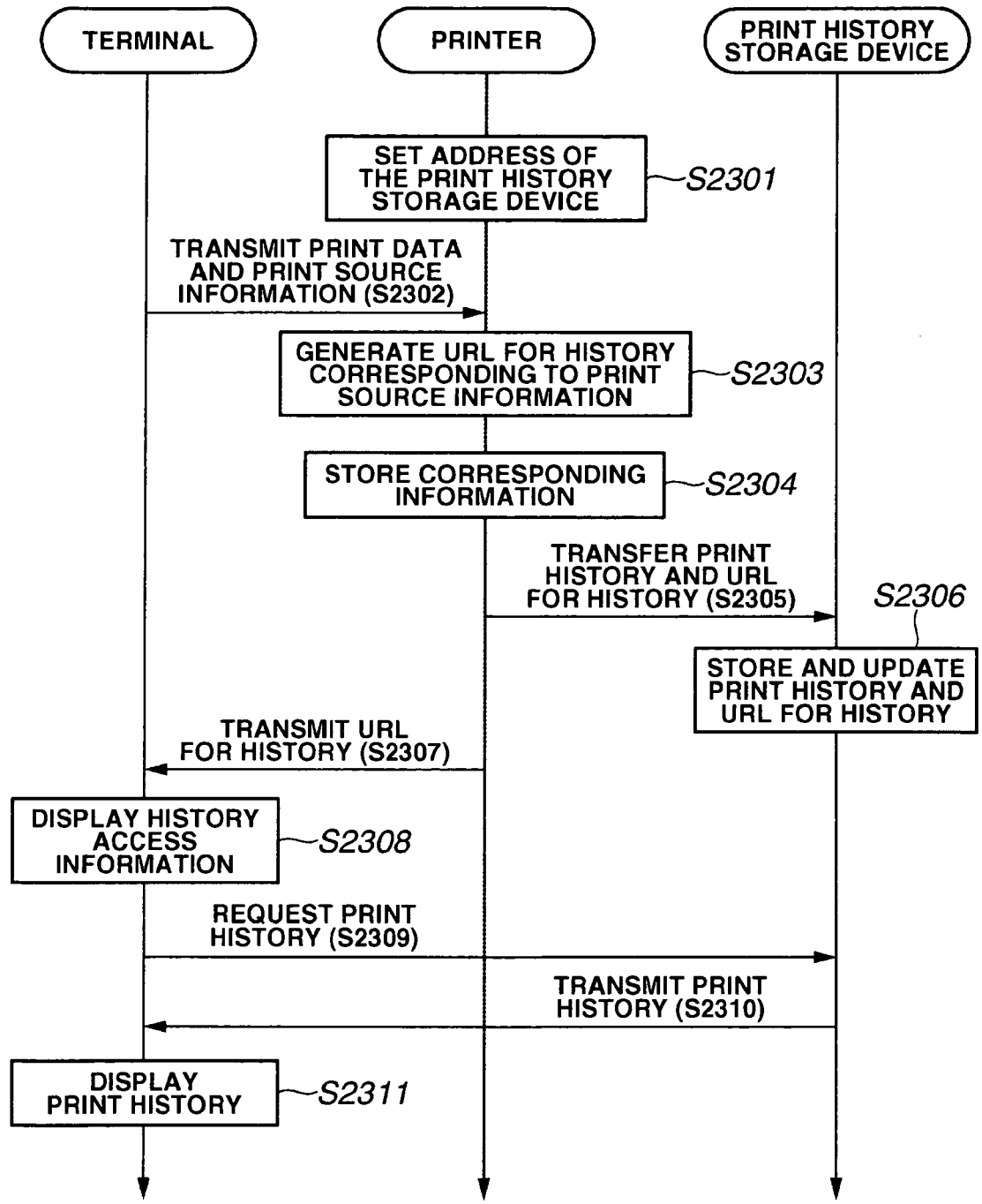
FIG. 23 is a sequence diagram showing a flow of processing to determine a print history storage space performed by a terminal, a printer and a print history storage device.

Then, a flow of processing to determine the print history storage space performed by the terminal, the printer and the print history storage device will be described with reference to the sequence diagram shown in FIG. 23.

The IP address of the print history storage device is previously set as storage destination of the print history in the printer (step S2301).

When the terminal starts to make a print request to the printer, the printer driver of the terminal writes print source information such as the print user name (testuser), the IP address (192.168.1.200) and the like in the PJL command in the print data, and transmits the print data in which the print source information is written to the printer (step S2302).

At the time of receiving the print data, the printer obtains the print source information from the PJL command and the protocol, and generates the URL for the history which does not duplicate on the print history storage device corresponding to the obtained print source information (step S2303).

Here, an authentication account (e.g., authentication user and password) which is required to access the URL at the time of the generation of the URL according to the setting of the printer is generated. The URL may be generated for each print job or may be generated for a particular terminal and each user.

The URL and the authentication account are generated by using the print source information and the information within the printer. But, a combination of part of the print source information and a character sting is used such that a third party is hard to specify the authentication account.

Example of a combination of an IP address of the print source, a print user name, and a random character string: URL=http://192.168.1.150/rireki-0001-192168001200-testuser-jN8fQiJk65Mcz.thml.

Example of using a print user name as the authentication user and a random character string as the password:

USER=testuser, PASS=Ohg7 KdW

For a scheme of the URL to be generated, HTTP (http://) or FTP (ftp://) can be used.

And, the printer stores corresponding information in the corresponding information storage portion (step S2304).

FIG. 24 is a diagram showing an example of corresponding information stored in the corresponding information storage portion.

As shown in FIG. 24, print source information (a print user name in the figure) and a URL for a history are stored in association with each other.

And, the printer transfers the URL for the history and the print history to the print history storage device (step S2305).

The print history storage device stores or updates the URL for the history and the print history transferred from the printer in association with each other in the print history storage portion (step S2306).

The printer includes the URL for the history into the PJL command (also includes the authentication user and password when the authentication account is generated), and transmits to the terminal (step S2307). As a transmission method, for a protocol having two-way communications, a response of the print command or a back channel is used, and for a protocol not having two-way communications, a protocol (e.g., HTTP or the like) in cooperation with a port monitor is used.

The printer driver of the terminal having received the URL for the history displays history access information which presents the URL for the history (step S2308). It should be noted that the method of displaying the history access information is the same as in Example 5.

And, where the print history is referred to, the terminal accesses the printer by designating the URL for the history by the Web browser to request the print history storage device for the print history (step S2309).

Upon accepting the print history request from the terminal, the print history storage device transmits to the terminal the print history which is stored in the URL for the history (step S2310).

Upon receiving the print history from the print history storage device, the terminal displays the received print history by the Web browser or the like (step S2311).

Figure 25:
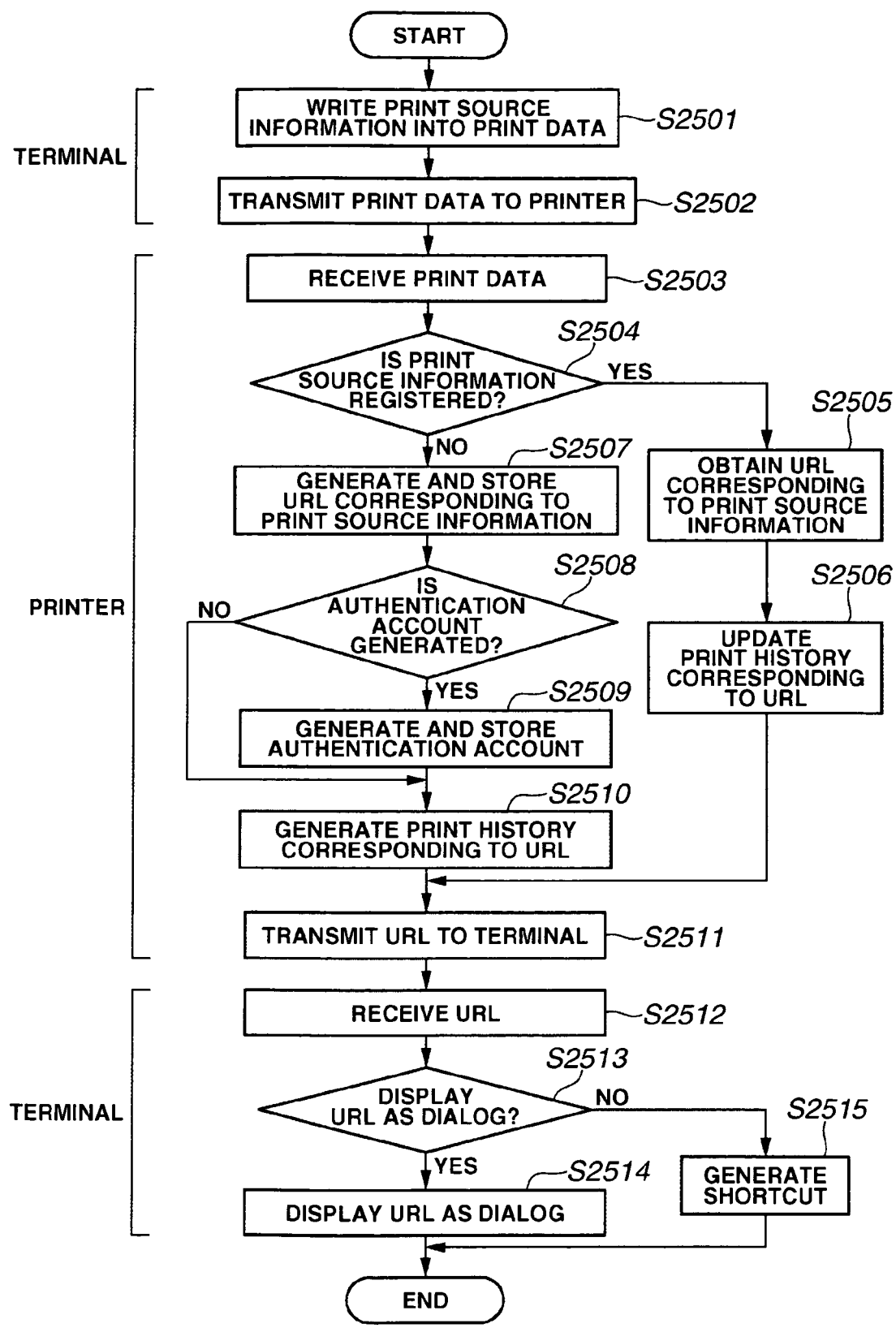
FIG. 25 is a flow chart showing a flow of processing performed by a device processing history storage system.

Then, a flow of processing performed by the device processing history storage system will be described with reference to the flow chart shown in FIG. 25.

The terminal writes print source information into print data (step S2501), and transmits the print data to the printer (step S2502).

The printer receives the print data (step S2503), it is checked whether or not the print source information written in the print data has been registered (step S2504), and if it has been registered (YES in step S2504), the process proceeds to step S2505, and if not (NO in step S2504), the process proceeds to step S2507.

If the print source information has been registered (YES in step S2504), the printer obtains the URL for the history corresponding to the print source information (step S2505), and updates the print history corresponding to the URL for the history (step S2506), and the process proceeds to step S2511.

If the print source information has not been registered (NO in step S2504), the printer generates and stores the URL for the history corresponding to the print source information (step S2507), if an authentication account is to be generated (YES in step S2508), the process proceeds to step S2509, and, if an authentication account is not generated (NO in step S2508), the process proceeds to step S2510.

Where the authentication account is generated (YES in step S2508), the printer generates the authentication account, and stores it in association with the URL for the history which is stored in step S2507 (step S2509), and the process proceeds to step S2510.

And, the printer generates a print history corresponding to the URL for the history (step S2510), and the process proceeds to step S2511.

Then, the printer transmits the URL for the history to the terminal (the authentication account is also transmitted if the authentication account is generated) (step S2511).

When the terminal receives the URL (or, the URL and the authentication account) (step S2512), to display the URL (or, the URL and the authentication account) as a dialog (YES in step S2513), the URL (or, the URL and the authentication account) is displayed as a dialog (step S2514), and the processing is terminated. Where a shortcut is to be generated (NO in step S2513), a shortcut is generated (step S2515), and the processing is terminated.

As described above, a first aspect of the present invention provides a device processing history storage system in which a device and a terminal are connected through a network, in which: the terminal includes: a request portion which transmits to the device a request for device processing or a request for storage of a history of the device processing; a history request portion which requests the device for the history; and a history display portion which displays the history received from the device, and the device includes: a device processing portion which performs the device processing according to the request for the device processing received from the terminal; a history generation portion which generates a history of the device processing performed by the device processing portion; a history storage portion which stores the history generated by the history generation portion in accordance with the request for the storage of the history of the device processing received from the terminal; and a history transmission portion which transmits to the terminal the history which is stored in the history storage portion in accordance with the request for the history received from the terminal.

A second aspect of the present invention is the device processing history storage system according to the first aspect of the invention in which: the request portion which is disposed in the terminal may include: a positional information setting portion which sets positional information for storing the history of the device processing requested by the terminal; a positional information transmission portion which transmits to the device the positional information set by the positional information setting portion before making a request for the device processing to the device; and a processing request portion which requests the device for the device processing when the positional information transmitted by the positional information transmission portion is approved by the device, and the device may further include: a positional information receiving portion which receives the positional information from the terminal; a duplication checking portion which checks duplication between the positional information received by the positional information receiving portion and the positional information received from another terminal; and an approval notification portion which notifies the terminal that the positional information is approved when it is checked by the duplication checking portion that the positional information does not duplicate, and the history storage portion disposed in the device stores the history generated by the history generation portion in a position indicated by the approved positional information.

A third aspect of the present invention is the device processing history storage system according to the second aspect of the invention in which the device may further include a positional information proposal portion which proposes, when it is checked by the duplication checking portion that the positional information duplicates, positional information different from the checked positional information to the terminal.

A fourth aspect of the present invention is the device processing history storage system according to the second aspect of the invention, in which the device may further include a terminal information acquisition portion which obtains terminal information on the terminal when the positional information is received from the terminal or the history request is received from the terminal; the history storage portion disposed in the device stores the terminal information obtained by the terminal information acquisition portion, together with the history, in the position indicated by the positional information; and the history transmission portion disposed in the device discriminates, according to the terminal information obtained by the terminal information acquisition portion, a history which is stored together with the obtained terminal information and transmits the discriminated history to the terminal.

A fifth aspect of the present invention is the device processing history storage system according to the second aspect of the invention, in which the device may further includes: an external storage device checking portion which checks whether or not it is possible to store the history into an external storage device connected to the network when the position indicated by the positional information is the external storage device connected to the network; and a positional information proposal portion which proposes positional information different from the positional information to the terminal when it is checked by the external storage device checking portion that it is impossible to store the history, and the history storage portion disposed in the device stores the history in the position indicated by the positional information of the external storage device when it is checked by the external storage device checking portion that it is possible to store the history.

A sixth aspect of the present invention is the device processing history storage system according to the first aspect of the invention, in which the request portion disposed in the terminal may include a processing request portion which, when requesting the device processing to the device, includes request source information about a requesting party or the terminal having made the request into the request, the terminal may further include a related information receiving portion which receives related information associated with the history from the device, the device may further include: a request source information acquisition portion which obtains request source information included in the device processing request from the terminal; a related information generation portion which generates related information which is associated with a history of device processing performed by the device processing portion according to the request source information obtained by the request source information acquisition portion; a first storage portion which stores the related information generated by the related information generation portion in correspondence with the request source information; and a related information transmission portion which transmits the related information to the terminal, and the history request portion disposed in the terminal requests the device for a history associated with the related information.

A seventh aspect of the present invention is the device processing history storage system according to the sixth aspect of the invention, in which the device may include a second storage portion which stores the related information and the history in association with each other, and a history transmission portion which transmits the history associated with the related information from the second storage portion to the terminal in accordance with the history request from the terminal.

An eighth aspect of the present invention is the device processing history storage system according to the sixth aspect of the invention, in which the related information generation portion may generate a URL in which all or part of the request source information is incorporated.

A ninth aspect of the present invention is the device processing history storage system according to the eighth aspect of the invention, in which the related information generation portion may generate a URL which has the request source information incorporated in the URL of the external storage device when the related information and the history are to be stored in the external storage device connected to the network.

A tenth aspect of the present invention is the device processing history storage system according to the sixth aspect of the invention, in which the related information generation portion may generate authentication information in which all or part of the request source information is incorporated when the device requires the authentication information.

An eleventh aspect of the present invention provides a device which performs device processing upon accepting a request from a terminal connected through a network, the device including: a device processing portion which performs the device processing according to the request for device processing received from the terminal; a history generation portion which generates a history of the device processing performed by the device processing portion; a history storage portion which stores the history generated by the history generation portion according to a request for the storage of the history of the device processing received from the terminal; and a history transmission portion which transmits to the terminal the history stored by the history storage portion in accordance with the history request received from the terminal.

A twelfth aspect of the present invention is the device according to the eleventh aspect of the invention, which may further include a positional information receiving portion which receives positional information for storing the history from the terminal, a duplication checking portion which checks duplication between the positional information received by the positional information receiving portion and positional information received from another terminal, and an approval notification portion which notifies the terminal that the positional information is to be approved when it is checked by the duplication checking portion that the positional information do not duplicate, in which the history storage portion may store the history generated by the history generation portion into a position indicated by the approved positional information.

A thirteenth aspect of the present invention is the device according to the eleventh aspect of the invention, which may further include a positional information proposal portion which proposes positional information different from the positional information to the terminal when it is checked by the duplication checking portion that the positional information duplicates.

A fourteenth aspect of the present invention is the device according to the twelfth aspect of the invention, which may further include a terminal information acquisition portion which obtains terminal information about the terminal at the time when the positional information is received from the terminal or the history request is received from the terminal, in which the history storage portion may store terminal information obtained by the terminal information acquisition portion together with the history into the position indicated by the positional information, and the history transmission portion may discriminate the history stored together with the terminal information in accordance with the terminal information obtained by the terminal information acquisition portion and transmits the discriminated history to the terminal.

A fifteenth aspect of the present invention is the device according to the twelfth aspect of the invention, which may further include: an external storage device checking portion which checks whether or not it is possible to store the history into an external storage device connected to the network when the position indicated by the positional information is the external storage device connected to the network; and a positional information proposal portion which proposes to the terminal positional information different from the positional information when it is checked by the external storage device checking portion that it is impossible to store the history, in which the history storage portion stores the history in the position indicated by the positional information of the external storage device when it is checked by the external storage device checking portion that it is possible to store the history.

A sixteenth aspect of the present invention is the device according to the eleventh aspect of the invention, which may further include: a request source information acquisition portion which obtains request source information about a requesting party or the terminal having made the request included in the device processing request from the terminal; a related information generation portion which generates related information which is associated with the history of the device processing performed by the device processing portion, according to the request source information obtained by the request source information acquisition portion; a first storage portion which stores the related information generated by the related information generation portion and the request source information in correspondence with each other; and a related information transmission portion which transmits the related information to the terminal.

A seventeenth aspect of the present invention is the device according to the sixteenth aspect of the invention, which may further include a second storage portion which stores the related information and the history in correspondence with each other; and a history transmission portion which transmits from the second storage portion to the terminal a history which is associated with the related information, in accordance with the history request from the terminal.

An eighteenth aspect of the present invention is the device according to the sixteenth aspect of the invention, in which the related information generation portion may generate a URL in which all or part of the request source information is incorporated.

A nineteenth aspect of the present invention is the device according to the eighteenth aspect of the invention, in which the related information generation portion may generate a URL having the request source information incorporated into the URL of the external storage device when the related information and the history are to be stored in an external storage device connected to the network.

A twentieth aspect of the present invention is the device according to the sixteenth aspect of the invention, in which the related information generation portion may generate authentication information in which all or part of the request source information is incorporated when the device requires the authentication information.

A twenty-first aspect of the present invention provides a processing history storing method which is performed by a device and a terminal connected through a network, in which:

the terminal transmits to the device a request for a device processing or a request for storage of a history of the device processing; the device performs the device processing according to the request for the device processing received from the terminal, generates a history of the performed device processing, and stores the generated history according to the request for storage of the history of the device processing received from the terminal; the terminal requests the device for the history; the device transmits the history stored in the history storage portion to the terminal according to the history request received from the terminal; and the terminal displays the history received from the device.

A twenty-second aspect of the present invention is the device processing history storing method according to the twenty-first aspect of the invention, in which the terminal may set positional information for storing the history of the device processing requested by the terminal and transmit the set positional information to the device before the device processing is requested to the device; the device may receive the positional information from the terminal, check duplication between the received positional information and positional information received from another terminal, and notify the terminal that the positional information is approved when it is confirmed that the positional information does not duplicate; the terminal may request the device to perform the device processing when the approval of the positional information is received from the device; and the device may perform the device processing according to the request for the device processing received from the terminal, generates a history of the performed device processing, and stores the generated history in a position indicated by the approved positional information.

A twenty-third aspect of the present invention is the device processing history storing method according to the twenty-second aspect of the invention, in which the device may propose to the terminal positional information different from the positional information when it is confirmed that the positional information duplicates.

A twenty-fourth aspect of the present invention is the device processing history storing method according to the twenty-second aspect of the invention, in which the device may obtain terminal information about the terminal when it receives the positional information from the terminal or accepts the history request from the terminal, store the terminal information obtained when the positional information is received from the terminal in the position indicated by the positional information together with the history, discriminate the history stored together with the terminal information according to the terminal information obtained when accepting the history request from the terminal, and transmit the discriminated history to the terminal.

A twenty-fifth aspect of the present invention is the device processing history storing method according to the twenty-second aspect of the invention, in which the device may check whether or not it is possible to store the history into an external storage device connected to the network if the position indicated by the positional information is the external storage device connected to the network, propose positional information different from the positional information to the terminal when it is confirmed that it is impossible to store the history, and store the history in the position indicated by the positional information of the external storage device when it is confirmed that it is possible to store the history.

A twenty-sixth aspect of the present invention is the device processing history storing method according to the twenty-first aspect of the invention, in which the terminal may transmit to the device the device processing request to the device by including request source information about a requesting party or the terminal having made the request into the device processing request; the device may obtain the request source information included in the device processing request from the terminal, generates related information to be related to a history of the performed device processing according to the obtained request source information, stores the generated related information and the request source information in correspondence with each other, and transmits the related information to the terminal; and the terminal may receive the related information related to the history from the device, and requests the device for the history related to the related information.

A twenty-seventh aspect of the present invention is the device processing history storing method according to the twenty-sixth aspect of the invention, in which the device may store the related information and the history in association with each other and transmit the history related to the related information to the terminal in response to the history request from the terminal.

A twenty-eighth aspect of the present invention is the device processing history storing method according to the twenty-sixth aspect of the invention, in which the device may generate a URL in which all or part of the request source information is included.

A twenty-ninth aspect of the present invention is the device processing history storing method according to the twenty-eighth aspect of the invention, in which the device may generate a URL having the request source information incorporated into the URL of the external storage device when the related information and the history are to be stored in an external storage device connected to the network.

A thirtieth aspect of the present invention is the device processing history storing method according to the twenty-sixth aspect of the invention, in which the device may generate authentication information in which all or part of the request source information is included when the device requires the authentication information.

According to the present invention, the user using the device can easily refer to the own job history, and the user's own job history is hardly referred to by another user, so that there is provided an effect of improving security.

Besides, according to the invention, a high level of security can be ensured as only the user who has performed the device processing can obtain the URL, and there is provided an effect that the user does not need to make troublesome operations such as setting and the like.

It is to be noted that the present invention is not limited to the embodiments described above and shown in the figures and many other changes and modifications may be made without departing from the scopes of the invention.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosures of Japanese Patent Application No. 2005-273864 filed on Sep. 21, 2005 and Japanese Patent Application No. 2005-278041 filed on Sep. 26, 2005 including specifications, claims, drawings and abstracts are incorporated herein by reference in their entireties.

What is claimed is:

1. A device processing history storage system, comprising:
   a terminal comprising:
   a request portion which transmits a request for device processing and a request to store a history of the device processing, the request to store the history of the device processing comprising a location at which the history is to be stored;
   a history request portion which transmits a request for the history; and
   a history display portion which displays the history received in response to the request for the history; and
   a device comprising:
   a device processing portion which performs the device processing according to the request for the device processing received from the terminal;
   a history generation portion which generates a history of the device processing performed by the device processing portion;
   a history storage portion which stores the history generated by the history generation portion in the location at which the history is to be stored in the request to store the history received from the terminal; and
   a history transmission portion which transmits to the terminal the history which is stored in the history storage portion in accordance with the request for the history received from the terminal.

2. The device processing history storage system according to claim 1, wherein the request portion comprises:
   a positional information setting portion which sets the location at which the history of the device processing is to be stored;
   a positional information transmission portion which transmits to the device the location set by the positional information setting portion before the request portion transmits the request for the device processing to the device; and
   a processing request portion which requests the device for the device processing when the location transmitted by the positional information transmission portion is approved by the device, and
   wherein the device further comprises:
   a positional information receiving portion which receives the location from the terminal;
   a duplication checking portion which determines whether the location at which the history is to be stored is available to store the history; and
   an approval notification portion which notifies the terminal that the location is approved if it is determined by the duplication checking portion that the location is available to store the history.

3. The device processing history storage system according to claim 2, wherein the device further comprises a positional information proposal portion which proposes to the terminal, if it is determined by the duplication checking portion that the location is not available to store the history, a second location different from the location requested by the terminal at which the history is available to be stored.

4. The device processing history storage system according to claim 2, wherein the device further includes a terminal information acquisition portion which obtains terminal information on the terminal when one of the location is received from the terminal and the request for the history is received from the terminal, wherein the history storage portion stores the terminal information obtained by the terminal information acquisition portion, together with the history, in the location, and wherein the history transmission portion determines, according to the terminal information obtained by the terminal information acquisition portion, a history which is stored together with the obtained terminal information and transmits the determined history to the terminal.

5. The device processing history storage system according to claim 2, wherein the device further comprises:
   an external storage device checking portion which determines whether it is possible to store the history into an external storage device when the location is in the external storage device; and
   a positional information proposal portion which proposes to the terminal, if it is determined by the external storage device checking portion that it is impossible to store the history in the location, a second location different from the location requested by the terminal at which the history is available to be stored, and
   wherein the history storage portion stores the history in the location of the external storage device if it is determined by the external storage device checking portion that it is possible to store the history in the location.

6. The device processing history storage system according to claim 1, wherein the request portion comprises:
   a processing request portion which, when requesting the device for the device processing, includes at least one of request source information about a requesting party and the terminal having made the request in the request for device processing,
   wherein the terminal further comprises a related information receiving portion which receives related information associated with the history from the device,
   wherein the device further comprises:
   a request source information acquisition portion which obtains request source information included in the request for device processing from the terminal;
   a related information generation portion which generates related information which is associated with a history of device processing performed by the device processing portion according to the request source information obtained by the request source information acquisition portion;
   a first storage portion which stores the related information generated by the related information generation portion in correspondence with the request source information; and
   a related information transmission portion which transmits the related information to the terminal, and
   wherein the history request portion requests the device for a history associated with the related information.

7. The device processing history storage system according to claim 6, wherein the device further comprises:
   a second storage portion which stores the related information and the history in association with each other; and
   a history transmission portion which transmits the history associated with the related information from the second storage portion to the terminal in accordance with the request for the history from the terminal.

8. The device processing history storage system according to claim 6, wherein the related information generation portion generates a URL in which at least part of the request source information is incorporated.

9. The device processing history storage system according to claim 8, wherein the related information generation portion generates a URL which has the request source information incorporated in the URL of the external storage device when the related information and the history are to be stored in the external storage device.

10. The device processing history storage system according to claim 6, wherein the related information generation portion generates authentication information in which at least part of the request source information is incorporated when the device requires the authentication information.

11. A device which performs device processing in response to a request for device processing from a terminal, the device comprising:
 a device processing portion which performs the device processing according to the request for device processing received from the terminal;
 a history generation portion which generates a history of the device processing performed by the device processing portion;
 a history storage portion which stores the history generated by the history generation portion in a location according to a request to store the history of the device processing received from the terminal, the request to store the history of the device processing comprising a location at which the history is to be stored; and
 a history transmission portion which transmits to the terminal the history stored by the history storage portion in accordance with a request for the history received from the terminal.

12. The device according to claim 11, further comprising:
 a positional information receiving portion which receives the location for storing the history from the terminal;
 a duplication checking portion which determines whether the location at which the history is to be stored is available to store the history; and
 an approval notification portion which notifies the terminal that the location is to be approved if it is determined by the duplication checking portion that the location is available to store the history.

13. The device according to claim 12, further comprising:
 a positional information proposal portion which proposes to the terminal, if it is determined by the duplication checking portion that the location is not available to store the history, a second location different from the location requested by the terminal at which the history is available to be stored.

14. The device according to claim 12, further comprising:
 a terminal information acquisition portion which obtains terminal information about the terminal when one of the location is received from the terminal and the request for the history is received from the terminal,
 wherein the history storage portion stores terminal information obtained by the terminal information acquisition portion together with the history in the location, and
 wherein the history transmission portion determines history stored together with the terminal information in accordance with the terminal information obtained by the terminal information acquisition portion and transmits the determined history to the terminal.

15. The device according to claim 12, further comprising:
 an external storage device checking portion which determines whether it is possible to store the history into an external storage device when the location is in the external storage device; and
 a positional information proposal portion which proposes to the terminal if it is determined by the external storage device checking portion that it is impossible to store the history in the location, a second location different from the location requested by the terminal at which the history is available to be stored,
 wherein the history storage portion stores the history in the location in the external storage device if it is determined by the external storage device checking portion that it is possible to store the history in the location.

16. The device according to claim 11, further comprising:
 a request source information acquisition portion which obtains request source information about at least one of a requesting party and the terminal having made the request for device processing included in the request for device processing from the terminal;
 a related information generation portion which generates related information which is associated with the history of the device processing performed by the device processing portion, according to the request source information obtained by the request source information acquisition portion;
 a first storage portion which stores the related information generated by the related information generation portion and the request source information in correspondence with each other; and
 a related information transmission portion which transmits the related information to the terminal.

17. The device according to claim 16, further comprising:
 a second storage portion which stores the related information and the history in correspondence with each other; and
 a history transmission portion which transmits from the second storage portion to the terminal a history which is associated with the related information, in accordance with the request for the history from the terminal.

18. The device according to claim 16, wherein the related information generation portion generates a URL in which at least part of the request source information is incorporated.

19. The device according to claim 18, wherein the related information generation portion generates a URL having the request source information incorporated into the URL of the external storage device when the related information and the history are to be stored in an external storage device.

20. The device according to claim 16, wherein the related information generation portion generates authentication information in which at least part of the request source information is incorporated when the device requires the authentication information.

21. A device processing history storing method which is performed by a device and a terminal, the method comprising:
 transmitting, by the terminal, to the device a request for device processing and a request to store a history of the device processing, the request to store the history of the device processing comprising a location at which the history is to be stored;
 performing, by the device, the device processing according to the request for the device processing received from the terminal, generating a history of the performed device processing, and storing the generated history in the location at which the history is to be stored in the request to store the history of the device processing received from the terminal;
 requesting, by the terminal, the history from the device;
 transmitting, by the device, the history stored in the location to the terminal according to the request for the history received from the terminal; and displaying, by the terminal, the history received from the device.

22. The device processing history storing method according to claim 21, further comprising:
  setting, by the terminal, the location at which the history of the device processing is to be stored, and transmitting the location to the device before the device processing is requested;
  receiving, by the device, the location from the terminal, determining whether the location at which the history is to be stored is available to store the history, and notifying the terminal that the location is approved if it is determined that the location is available to store the history;
  requesting, by the terminal, the device to perform the device processing when the approval of the location is received from the device; and
  performing, by the device, the device processing according to the request for the device processing received from the terminal, generating the history of the performed device processing, and storing the generated history in the approved location.

23. The device processing history storing method according to claim 22, further comprising proposing to the terminal, if it is determined that the location is not available to store the history, a second location different from the location requested by the terminal at which the history is available to be stored.

24. The device processing history storing method according to claim 22, further comprising:
  obtaining, by the device, terminal information about the terminal when one of the device receives the location from the terminal and accepts the request for the history from the terminal;
  storing the terminal information obtained when the positional information is received from the terminal in the location together with the history;
  determining the history stored together with the terminal information according to the terminal information obtained when accepting the history request from the terminal; and
  transmitting the discriminated history to the terminal.

25. The device processing history storing method according to claim 22, further comprising:
  determining, by the device, whether it is possible to store the history into an external storage device connected to the network if the location is in the external storage device;
  proposing a second location different from the location to the terminal at which the history is available to be stored if it is determined that it is impossible to store the history in the location; and
  storing the history in the location of the external storage device if it is determined that it is possible to store the history in the location.

26. The device processing history storing method according to claim 21, wherein the transmitting by the terminal comprises transmitting, by the terminal, to the device the request for device processing and including at least one of request source information about a requesting party and the terminal having made the request in the request for device processing; and
  the method further comprises:
    obtaining, by the device, the request source information included in the request for device processing from the terminal, generating related information to be related to a history of the performed device processing according to the obtained request source information, storing the generated related information and the request source information in correspondence with each other, and transmitting the related information to the terminal; and
    receiving, by the terminal, the related information related to the history from the device, and requesting the device for the history related to the related information.

27. The device processing history storing method according to claim 26, wherein the storing comprises storing, by the device, the related information and the history in association with each other, and transmitting the history related to the related information to the terminal in response to the request for the history from the terminal.

28. The device processing history storing method according to claim 26, wherein the generating comprises generating, by the device, a URL in which at least part of the request source information is included.

29. The device processing history storing method according to claim 28, wherein the generating comprises generating, by the device, a URL having the request source information incorporated into the URL of the external storage device when the related information and the history are to be stored in an external storage device.

30. The device processing history storing method according to claim 26, wherein the generating comprises generating, by the device, authentication information in which at least part of the request source information is included when the device requires the authentication information.

* * * * *